US012797813B2

(12) United States Patent
Lentz

(10) Patent No.: US 12,797,813 B2
(45) Date of Patent: Nov. 17, 2026

(54) REACTOR FOR THE SUPERCRITICAL HYDROTHERMAL GASIFICATION OF BIOMASS

(71) Applicant: IGAS ENERGY GMBH, Stolberg (DE)

(72) Inventor: Karl-Heinz Lentz, Stolberg (DE)

(73) Assignee: iGas energy GmbH, Stolberg (DE)

( * ) Notice: Subject to any disclaimer, the term of this patent is extended or adjusted under 35 U.S.C. 154(b) by 751 days.

(21) Appl. No.: 18/016,393

(22) PCT Filed: Jul. 15, 2021

(86) PCT No.: PCT/EP2021/069848

§ 371 (c)(1),
(2) Date: Jan. 16, 2023

(87) PCT Pub. No.: WO2022/013391

PCT Pub. Date: Jan. 20, 2022

(65) Prior Publication Data

US 2023/0277994 A1 Sep. 7, 2023

(30) Foreign Application Priority Data

Jul. 17, 2020 (EP) .................................... 20186443

(51) Int. Cl.
*B01J 3/02* (2006.01)
*B01J 3/00* (2006.01)
(Continued)

(52) U.S. Cl.
CPC ................. *B01J 3/008* (2013.01); *B01J 3/02* (2013.01); *B09B 3/00* (2013.01); *C01B 3/02* (2013.01);
(Continued)

(58) Field of Classification Search
CPC . B01J 3/008; B01J 3/02; C02F 11/086; C02F 2301/066; C01B 3/02; C05B 17/00; C05C 3/00; C05F 7/00; B09B 3/00
See application file for complete search history.

(56) References Cited

U.S. PATENT DOCUMENTS 9,090,828 B2 7/2015 Dahmen et al.
2009/0127209 A1* 5/2009 Turc ......................... B01J 8/006 422/219
(Continued)

FOREIGN PATENT DOCUMENTS

CN 102503013 A 6/2012
DE 29719196 U1 12/1997
(Continued)

OTHER PUBLICATIONS

N. Boukis, U. Galia, V. Diem and E. Dinjus, "Biomass gasification in supercritical water: first results of the pilot plant", Science in Thermal and Chemical Biomass Conversion, vol. 2, p. 975 (2006).*
(Continued)

*Primary Examiner* — Wayne A Langel
(74) *Attorney, Agent, or Firm* — Jeff B. Vockrodt; CM Law

(57) ABSTRACT

The invention relates to a reactor 1 for supercritical hydrothermal gasification of aqueous multicomponent mixtures in the absence of oxygen. It is also an object of the invention to provide a system for operating the reactor 1, a method for operating the reactor 1, and the use of the reactor 1. The reactor 1 according to the invention is compatible with many existing systems, is compact, can be provided on a turnkey basis, and can be manufactured and operated at low cost. The reactor 1 according to the invention thus enables, for the
(Continued)

Figure 1:
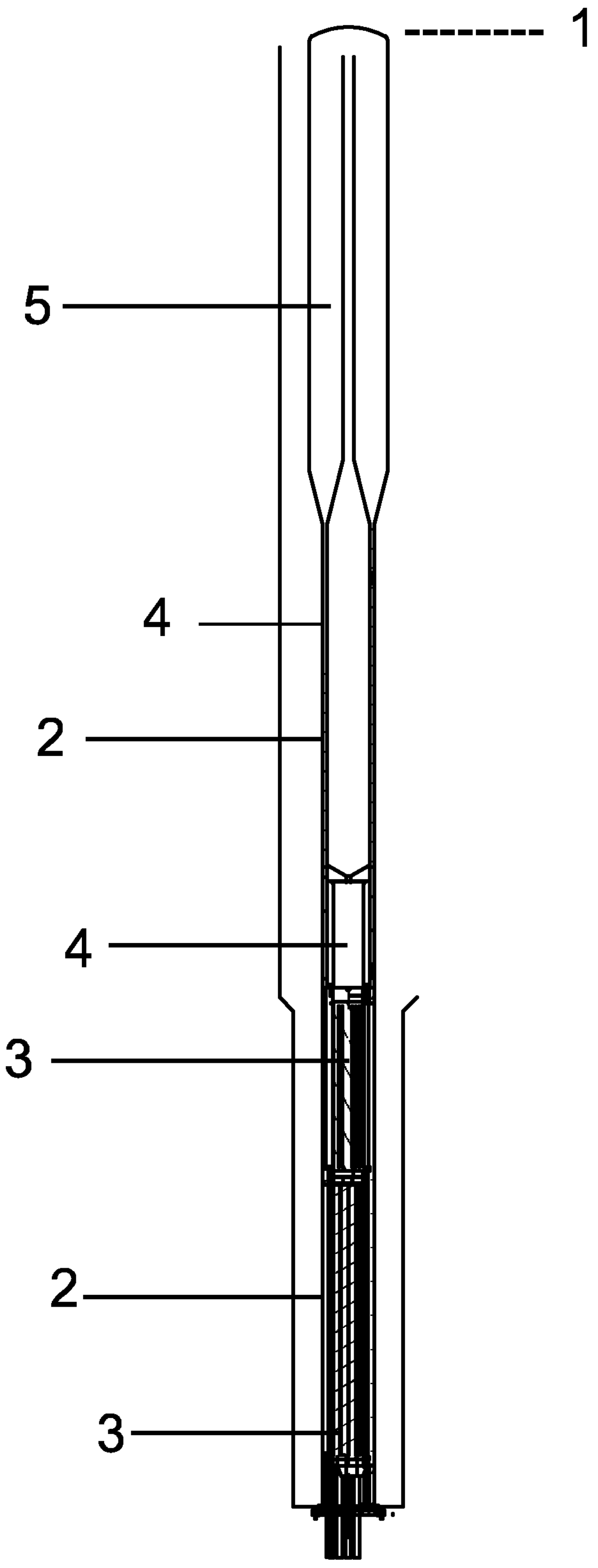

first time, a diverse commercial use of hydrothermal gasification of biomass, sewage sludge and other organic wastes in supercritical water.

17 Claims, 4 Drawing Sheets

(51) Int. Cl.

| | |
|---|---|
| ***B09B 3/00*** | (2022.01) |
| ***C01B 3/02*** | (2026.01) |
| ***C02F 11/08*** | (2006.01) |
| ***C05B 17/00*** | (2006.01) |
| ***C05C 3/00*** | (2006.01) |
| ***C05F 7/00*** | (2006.01) |
| *C02F 101/10* | (2006.01) |
| *C02F 101/16* | (2006.01) |
| *C02F 101/20* | (2006.01) |

(52) U.S. Cl.

CPC ............ *C02F 11/086* (2013.01); *C05B 17/00* (2013.01); *C05C 3/00* (2013.01); *C05F 7/00* (2013.01); *C02F 2101/105* (2013.01); *C02F 2101/16* (2013.01); *C02F 2101/20* (2013.01); *C02F 2201/002* (2013.01); *C02F 2301/066* (2013.01)

(56) References Cited

U.S. PATENT DOCUMENTS

| | | | | |
|---|---|---|---|---|
| 2010/0037520 | A1* | 2/2010 | Goldacker | C10J 3/14 48/78 |
| 2019/0039036 | A1 | 2/2019 | Brucato et al. | |
| 2020/0247701 | A1 | 8/2020 | Lentz | |

FOREIGN PATENT DOCUMENTS

| | | | | | |
|---|---|---|---|---|---|
| DE | 29913370 | U1 | | 9/1999 | |
| DE | 20220307 | U1 | | 4/2003 | |
| DE | 10217165 | A1 | | 2/2004 | |
| DE | 102005037469 | A1 | | 2/2007 | |
| DE | 102006044116 | | | 4/2008 | |
| DE | 102008028788 | A1 | | 1/2010 | |
| DE | 102018104595 | A1 | | 1/2019 | |
| DE | 212018000266 | U1 | | 8/2020 | |
| EP | 1010931 | A1 | | 6/2000 | |
| EP | 1845148 | A2 | | 10/2007 | |
| EP | 3434382 | B1 | | 9/2019 | |
| EP | 3940041 | A1 | | 1/2022 | |
| NL | 1039006 | C2 | * | 2/2013 | C01B 3/02 |
| WO | WO 2012/056073 | | * | 5/2012 | B01J 19/26 |
| WO | WO-2017130152 | A1 | * | 8/2017 | C02F 11/086 |
| WO | WO-2018065641 | A1 | * | 4/2018 | C02F 1/72 |
| WO | 2019020209 | A1 | | 1/2019 | |

OTHER PUBLICATIONS

Office Action received in Chinese Application No. 202180060352.4 dated Mar. 26, 2025, with translation, 9 pages.

Search Report received in International Application No. PCT/EP2021/069848 dated Nov. 3, 2022, with translation, 30 pages.

Written Opinion received in International Application No. PCT/EP2021/069848 dated Nov. 3, 2022, with translation, 29 pages.

Notice of Allowance received in Chinese Application No. 202180060352.4 dated Nov. 26, 2025, with translation, 2 pages.

Office Action received in Australian Application No. 2021308417 dated May 4, 2026, 3 pages.

Office Action received in European Application No. 21 745 784.5-1014 dated Jun. 12, 2026, with translation, 26 pages.

Search Report received in European Application No. 20186443.6-1101 dated Jan. 15, 2021, with translation, 20 pages.

Written Opinion received in International Application No. PCT/EP2021/069848 dated May 31, 2022, with translation, 28 pages.

* cited by examiner

REACTOR FOR THE SUPERCRITICAL HYDROTHERMAL GASIFICATION OF BIOMASS

The invention relates to a reactor for supercritical hydrothermal gasification of aqueous multicomponent mixtures in the absence of oxygen. It is also an object of the invention to provide a system for operating the reactor, a method of operating the reactor, and the use of the reactor. The reactor according to the invention is compatible with many existing systems, is compact, can be provided on a turnkey basis, and can be manufactured and operated at low cost. The reactor according to the invention thus enables, for the first time, a wide variety of commercial uses for the hydrothermal gasification of biomass, sludge and other organic wastes in supercritical water.

By suitable selection of the process parameters, the energy carriers hydrogen and methane can be produced from biomass and organic waste by supercritical hydrothermal gasification at pressures of 25 MPa and temperatures of 600 to 700 degrees Celsius in supercritical water without the addition of catalysts and in the absence of oxygen. The biomass or organic waste used as reactant is usually a multicomponent mixture of unknown composition. In addition to a variety of different organic compounds, the biomass or organic waste includes other valuable materials such as inorganic compounds like metals, metal salts and sand. It is advantageous to separate the valuable materials present in the aqueous multicomponent mixtures from the aqueous biomass prior to supercritical hydrothermal gasification. This is known from WO2019/020209.

Reactors for supercritical hydrothermal gasification are disclosed in DE20220307U1, DE29719196U1, DE29913370U1, DE10217165A1, DE102005037469A1, DE10200604411663, DE102008028788A1.

The process conditions and demands on the reactors for supercritical hydrothermal gasification of biomass are demanding due to the high pressure in combination with the high temperature and the reactants used. Reactors for supercritical hydrothermal gasification must therefore either be specially adapted and/or regularly renewed or cleaned. The high temperature in supercritical hydrothermal gasification promotes corrosion processes on the reactor. The material for the reactor must therefore be resistant to temperature, corrosion and pressure. High-temperature and corrosion-resistant materials are known. However, these materials are not pressure-resistant in the relevant temperature range of 600 degrees Celsius.

US 2009/127209 A1 discloses a reactor for hydrothermal oxidation of aqueous waste materials with the addition of an oxidant, preferably air, at pressures above 22.1 MPa and a temperature above 374 degrees Celsius. The reactor includes an inner corrosion resistant shell, outer shell and water under pressure between the shells, an agitator turbine attached to the bottom of the reactor with a central shaft and a plurality of blades extending the entire length of the reactor into all portions of the inner shell. At the reactor outlet is a filter device connected to a heat exchanger.

Another problem with supercritical hydrothermal gasification of biomass is that heating changes the solubility of contained salts, which are precipitated or precipitate in supercritical water and block the reactor.

CN 102503013 also discloses a reactor for hydrothermal oxidation of waste materials having an inner corrosion-resistant shell and an outer pressure-resistant shell, with water between the shells, and in the inner shell a heating wire and a hydrocyclone for separating solids, an outlet for the brine, and a heterogeneous catalyst, the hydrocyclone being located upstream of the heterogeneous catalyst to separate salts prior to oxidation.

The above reactors are not suitable for supercritical hydrothermal gasification, which takes place at temperatures of 600 to 700 degrees Celsius, because these temperatures cannot be reached with these reactors in aqueous biomass flowing through the reactor. Another disadvantage of hydrothermal oxidation is that catalysts must be used in the reactor, which are easily poisoned and therefore must be replaced frequently. Also, the separation of inorganic components in the known reactors is not complete or occurs only after the hydrothermal conversion. In contrast to supercritical hydrothermal gasification in the absence of oxygen, in which a synthesis gas is produced from organic compounds that consists predominantly of hydrogen, methane, carbon dioxide and water, hydrothermal oxidation produces a synthesis gas that contains significant amounts of carbon monoxide (CO).

DE102018104595A1 discloses to perform supercritical hydrothermal gasification in a reactor having an inner vessel and an outer vessel, the inner vessel being temperature and corrosion resistant and the outer vessel being pressure resistant.

DE102018104595A1 discloses using a nickel-based alloy for the inner vessel and having a gas compressed to gasification pressure between the vessels so that the inner vessel is not subjected to a pressure difference. The reactor disclosed in DE102018104595A1 waives the separation of the salt prior to hydrothermal gasification, so that the reactor quickly becomes blocked and thus unusable.

WO2019/020209 and DE21201800266 disclose devices for supercritical hydrothermal gasification of biomass in the absence of oxygen, in which inorganic constituents are completely separated by heating the compressed biomass to up to 550 degrees Celsius prior to supercritical hydrothermal gasification, so that solids and salts cannot block the reactor during subsequent supercritical hydrothermal gasification. However, the devices claimed in WO2019/020209 and DE21201800266 are not suitable for compact design.

These multiple requirements for a reactor for the hydrothermal gasification of biomass in supercritical water have so far prevented commercial use of this technology for the recovery of recyclable materials from aqueous organic waste and for energy production.

The task of the present invention is to provide a reactor for supercritical hydrothermal gasification of biomass which does not have the above-mentioned disadvantages and therefore enables broad commercial use of the technology of supercritical hydrothermal gasification of biomass and organic waste.

This task is solved by the reactor 1 according to the invention.

An object of the invention is a reactor 1 for the supercritical hydrothermal gasification of aqueous multicomponent mixture compressed to 25 to 35 MPa in the absence of oxygen, comprising a pressure-tight sealable inner shell 2, in the inner shell 2 a separation area 3 for heating compressed aqueous multicomponent mixture up to 550 degrees Celsius and separating recyclable materials from compressed aqueous multicomponent mixture, in the inner shell 2 a heating area 4 for heating compressed aqueous multicomponent mixture after separation of recyclable material to 600 to 700 degrees Celsius preferably comprising one or more means for heating, in the inner shell 2 a dwell area 5 for supercritical hydrothermal gasification of compressed aqueous multicomponent mixture after heating to 600 to 700 degrees Celsius.

The reactor 1 according to the invention is inexpensive, can be built compactly and transported to the place of use ready for operation. This enables the reactor 1 according to the invention to be used in a wide variety of waste disposal, water treatment and energy supply plants.

The reactor 1 according to the invention is suitable for the supercritical hydrothermal gasification of aqueous multicomponent mixture compressed to 25 to 35 MPa in the absence of oxygen. When the reactor 1 is operated as intended, aqueous multicomponent mixture compressed to 25 to 35 MPa is heated to up to 700 degrees Celsius in the reactor 1. The inner shell 2 forms a two-dimensional and complete or extensive boundary between the separation area 3, heating area 4 and dwell area 5, which are arranged inside the reactor 1, and the area outside the inner shell 2. The inner shell 2 of the reactor 1 according to the invention forms a pressure space (=first pressure space 15). The first pressure space 15 can be sealed in a pressure-tight manner. As a result, the pressure of 25 to 35 MPa is maintained inside the first pressure space 15 in the separation area 3, the heating area 4 and the dwell area 5, i.e. during heating of the compressed aqueous multicomponent mixture, separation of recyclable materials from the compressed aqueous multicomponent mixture and further heating of the compressed aqueous multicomponent mixture up to supercritical hydrothermal gasification, during supercritical hydrothermal gasification and after supercritical hydrothermal gasification. In order to maintain the pressure inside the inner shell 2, the inner shell 2 is capable of being sealed in a pressure-tight manner. The inner shell 2 encloses the first pressure space 15 inside the inner shell 2. The first pressure space 15 inside the reactor 1 includes separation area 3, heating area 4 and dwell area 5, which are connected to each other.

Pressure-tight sealable means that the set pressure of 25 to 35 MPa is maintained in the inner shell 2 when the inner shell 2 is pressure-tightly sealed. The inner shell 2 can completely enclose the separation area 3, the heating area 4 and the dwell area 5. Pressure-tightly sealable means that the inner shell 2 can include openings or can be opened. For example, the pressure-tight lockable inner shell 2 may comprise one or more connections to the outside, for example openings, for example openings for lines 14, wherein the openings and the openings for lines 14 are connected to each other in a pressure-tight lockable manner. All connections to the outside are connected to the inner shell 2 in the reactor 1 according to the invention in such a way that the connection can be closed in a pressure-tight manner. The openings in the inner shell 2 and/or the openings for lines 14 can be closed in a pressure-tight manner, for example, via valves. In special embodiments, the pressure-tight sealable inner shell 2 is a pressure-tight sealed inner shell 2.

In particularly preferred embodiments, the reactor 1 according to the invention comprises an outer shell 6 surrounding the inner shell 2. In preferred embodiments of the reactor 1 comprising an inner shell 2 and an outer shell 6, the outer shell 6 forms a second pressure space 16 in that the outer shell 6 forms a planar and complete or extensive boundary between the inner shell 2 and the exterior. In particularly preferred embodiments of the reactor 1, the outer shell 6 is an outer shell 6 that can be sealed in a pressure-tight manner. The outer shell 6 can completely enclose the inner shell 2. Preferably, the outer shell 6 comprises one or more connections to the outside, for example openings or openings for lines 14. In preferred embodiments of the reactor 1, all connections to the outside are connected to the outer shell 6 such that the connection can be sealed in a pressure-tight manner.

An object of the invention is a reactor 1 for the supercritical hydrothermal gasification of aqueous multicomponent mixture compressed to 25 to 35 MPa in the absence of oxygen, comprising a pressure-tight sealable inner shell 2, in the inner shell 2 a separation area 3 for heating compressed aqueous multicomponent mixture up to 550 degrees Celsius and separating recyclable materials from compressed aqueous multicomponent mixture, in the inner shell 2 a heating area 4 for heating compressed aqueous multicomponent mixture after separation of recyclable material to 600 to 700 degrees Celsius preferably comprising one or more means for heating, in the inner shell 2 a dwell area 5 for supercritical hydrothermal gasification of compressed aqueous multicomponent mixture after heating to 600 to 700 degrees Celsius, an outer shell 6 surrounding the inner shell 2 and a second pressure space 16 between the inner shell 2 and the outer shell 6.

In alternative embodiments, the reactor 1 according to the invention comprises an inner shell 2 but no outer shell 6. In cases where the reactor 1 does not comprise an outer shell 6, the inner shell 2 is adapted to the pressure difference between the interior of the reactor 1 and the exterior.

In particularly preferred embodiments, the reactor 1 according to the invention comprises an inner shell 2 that can be sealed in a pressure-tight manner, in the inner shell 2, a separation area 3 with one or more means for heating compressed aqueous multicomponent mixture to up to 550 degrees Celsius and one or more means for separating recyclable material from the compressed aqueous multicomponent mixture, in the inner shell 2 a heating area preferably with one or more means for heating compressed aqueous multicomponent mixture after separation of recyclable material to 600 to 700 degrees Celsius, in the inner shell 2 a dwell area 5 for supercritical hydrothermal gasification of compressed aqueous multicomponent mixture after heating to 600 to 700 degrees Celsius, wherein separation area 2, heating area 4 and dwell area 5 are arranged as a column. The reactor 1 may comprise a pressure-tight sealable outer shell 6 surrounding the inner shell 2 and a second pressure space 16 between the inner shell 2 and the outer shell 6.

The arrangement of internals such as means for heating and means for separation in the form of a hollow, slender column is referred to as a column. In particularly preferred embodiments of the reactor 1 according to the invention, separation area 3, heating area 4 and dwell area 5 are arranged in the inner shell 2 in a column. The column is a process engineering apparatus for separation by the physical properties and equilibrium states between different phases. In particularly preferred embodiments of the reactor 1 according to the invention, the inner shell 2 comprises the column wall. In other particularly preferred embodiments of the reactor 1 according to the invention, the inner shell 2 is the column wall. In the column, the aqueous multicomponent mixture compressed to 25 to 35 MPa flows first through the separation area 3, then through the heating area 4, and then through the dwell area 5 of the reactor 1 according to the invention. In the column, the heating area 4 is adjacent to the separation area 3, and the heating area 4 is adjacent to the dwell area 5.

Means for heating compressed aqueous multicomponent mixture are preferably heating elements such as heat exchangers or electric heaters, means for separating recyclable materials are preferably collectors or separators. For separation of recyclable materials from the compressed aqueous multicomponent mixture in separation area 3, the column comprises internals such as heat exchangers and collectors and/or separators. In separation area 3, the column may include additional heating elements for further heating of compressed aqueous multicomponent mixture. In separation area 3, heating area 4 and dwell area 5, the column may comprise further internals. A particularly preferred embodiment of the reactor 1 according to the invention is the arrangement of the individual internals as a column. In particularly preferred embodiments, the column (the reactor 1) is upright. The arrangement of the reactor 1 in an upright column is particularly advantageous because, for example, in the separation area the volatile components contained in the aqueous multicomponent mixture rise in the upright column, while the recyclable materials (e.g. solids, metal salts, phosphates and ammonium compounds) fall down in the column and can be easily separated.

In preferred embodiments, the reactor 1 according to the invention comprises an inner shell 2 that can be sealed in a pressure-tight manner,

- in the inner shell 2, a separation area 3 with one or more heat exchangers for heating compressed aqueous multicomponent mixture to up to 550 degrees Celsius and one or more collectors or separators for separating recyclable material from the compressed aqueous multicomponent mixture,
- in the inner shell 2 a heating area 4 with one or more heating elements for heating compressed aqueous multicomponent mixture after separation of recyclable materials to 600 to 700 degrees Celsius,
- in the inner shell 2 a dwell area 5 for supercritical hydrothermal gasification of compressed aqueous multicomponent mixture after heating to 600 to 700 degrees Celsius,
- wherein separation area 3, heating area 4 and dwell area 5 are arranged as a column. The reactor 1 may comprise an outer shell 6 surrounding the inner shell 2 and a second pressure space 16 between the inner shell 2 and the outer shell 6. In a particularly preferred embodiment, the column is upright.

The reactor 1 according to the invention can comprise diverse combinations of internals and detailed designs of the mold. The various detailed embodiments allow adaptation to different process requirements, different aqueous multicomponent mixtures, different applications. Examples are given below for the diverse embodiments of the reactor 1 according to the invention. However, the invention is not limited to the disclosed embodiments.

In particularly preferred embodiments of the reactor 1 according to the invention, the one or more heating elements and the one or more separators in the separation area 3, the one or more heating elements in the heating area 4 are arranged as internals in a column. In the reactor 1, the separator area 3 is connected to the heating area 4 and the heating area 4 is connected to the dwell area 5. Through this arrangement in reactor 1, the compressed aqueous multicomponent mixture first flows through the heating elements and separators in separator area 3, whereby recyclable materials are separated, then through heating area 4 whereby the compressed aqueous multicomponent mixture is heated to the gasification temperature of 600 to 700 degrees Celsius, and whereby heating area 4 passes into dwell area 5, through which the aqueous multicomponent mixture flows and is thereby converted to synthesis gas and water. The supercritical hydrothermal gasification of aqueous multicomponent mixture compressed to 25 to 35 MPa takes place in reactor 1 at temperatures of 600 to 700 degrees Celsius (=gasification temperature), i.e. during the transition from heating area 4 to dwell area 5 and in dwell area 5.

Reactor 1 comprises heating elements and separators for separating recyclable materials from compressed aqueous multicomponent mixture, which are arranged in reactor 1 in such a way that the recyclable materials are separated from compressed aqueous multicomponent mixture before supercritical hydrothermal gasification. In this process, the recyclable materials are separated that precipitate from the compressed aqueous multicomponent mixture when the temperature is increased to up to 550 degrees Celsius. By separating recyclable materials such as sand, salts and nutrients from the compressed aqueous multicomponent mixture before heating to >550 degrees Celsius or by separating recyclable materials such as sand, salts and nutrients in the separation area 3 of reactor 1 before heating to the gasification temperature of 600 to 700 degrees Celsius, the substances contained in aqueous multicomponent mixtures which could block the reactor 1 in the heating area 4 and/or in the dwell area 5 and which contribute significantly to corrosion at high temperatures are largely separated. After separation of recyclable materials, the aqueous multicomponent mixture comprises essentially only organic compounds and components. This prevents blocking of the reactor 1 and reduces corrosion of the reactor 1.

By arranging the separation area 3, heating area 4 and dwell area 5 of the reactor 1 according to the invention as a column, a compact design of the reactor 1 is also possible. The reactor 1 according to the invention has, for example, a height or length of 30 meters, for example 25 meters, preferably 20 meters or 17 meters, or less, for example 10 meters, or 5 meters. For example, the reactor 1 has a diameter of 3 meters or less, for example 0.5 to 2.5 meters, preferably 1 to 2 meters, for example 1.5 meters, 1.6 meters, 1.7 meters, 1.8 meters, 1.9 meters. In preferred embodiments, the reactor 1 has a diameter of 1.2 meters to 2.5 meters, preferably 1.8 meters.

In preferred embodiments, the reactor 1 according to the invention comprises an inner shell 2 that can be sealed in a pressure-tight manner,

- in the inner shell 2, a separation area 3 with one or more heat exchangers for heating compressed aqueous multicomponent mixture to up to 550 degrees Celsius and one or more collectors or separators for separating recyclable material from the compressed aqueous multicomponent mixture,
- a heating area 4 in the inner shell 2 for heating the compressed aqueous multicomponent mixture after separation of recyclable materials to 600 to 700 degrees Celsius, preferably comprising one or more heating elements,
- in the inner shell 2 a dwell area 5 for supercritical hydrothermal gasification of compressed aqueous multicomponent mixture after heating to 600 to 700 degrees Celsius,
- where separation area 3, heating area 4 and dwell area 5 are arranged as a column,
- wherein the reactor 1 has a height of 30 meters or less and a diameter of 2.5 meters or less. In particular embodiments, the reactor 1 has a height of 15 meters to 20 meters and a diameter of 1 meter to 2 meters. In particular embodiments, the reactor 1 has a length of 17 meters and a diameter of 1.8 meters. The reactor 1 may include an outer shell 6 surrounding the inner shell 2 and a second pressure space 16 between the inner shell 2 and the outer shell 6.

In a preferred embodiment of the reactor 1, a valuable material fraction WF1 is separated from the multicomponent mixture compressed to 25 to 35 MPa at 400 to 550 degrees Celsius in the separation area 3. In a further embodiment of the reactor 1, a valuable material fraction WF1 is separated at 300 to 550 degrees Celsius from the aqueous multicomponent mixture compressed to 25 to 35 MPa in the separation area 3. In a further embodiment of the reactor 1, a valuable material fraction WF1 is separated at 300 to 400 degrees Celsius from the aqueous multicomponent mixture compressed to 25 to 35 MPa in the separation area 3. In a further embodiment of the reactor 1, a valuable material fraction WF1 is separated at 200 to 400 degrees Celsius from the aqueous multicomponent mixture compressed to 25 to 35 MPa in the separation area 3. For this purpose, the reactor 1 according to the invention comprises, in the inner shell 2, a separation area 3 comprising heat exchanger WT1 9 for heating compressed aqueous multicomponent mixture to a temperature selected from 400 to 550 degrees Celsius, 300 to 550 degrees Celsius, 300 to 400 degrees Celsius, 200 to 400 degrees Celsius, and separator A1 for separating a valuable material fraction WF1 from the compressed aqueous multicomponent mixture. When the aqueous multicomponent mixture compressed to 25 to 35 MPa is heated to at least 200 degrees Celsius, for example 300, preferably 400 to 550 degrees Celsius, recyclable materials such as solids, metal salts, nutrients in at least one valuable material fraction WF1 are separated from the compressed aqueous multicomponent mixture.

In preferred embodiments, the reactor 1 according to the invention comprises an inner shell 2 that can be sealed in a pressure-tight manner, in the inner shell 2, a separation area 3 comprising heat exchanger WT1 9 for heating compressed aqueous multicomponent mixture to 200 to 550 degrees Celsius, preferably to 400 to 550 degrees Celsius, and separator A1 for separating a valuable material fraction WF1 from the compressed aqueous multicomponent mixture, a heating area 4 in the inner shell 2 for heating the compressed aqueous multicomponent mixture after separation of the valuable material fraction WF1 to 600 to 700 degrees Celsius, preferably comprising one or more heating elements, in the inner shell 2 a dwell area 5 for supercritical hydrothermal gasification of the compressed aqueous multicomponent mixture after heating to 600 to 700 degrees Celsius, wherein separation area 3, heating area 4 and dwell area 5 are preferably arranged as a column. The reactor 1 may comprise an outer shell 6 surrounding the inner shell 2 and a second pressure space 16 between the inner shell 2 and the outer shell 6.

In a further preferred embodiment of the reactor 1 according to the invention, the recyclable materials are separated in more than one valuable material fraction, for example in two or three or more valuable material fractions. Whether one or more valuable material fractions are separated depends, for example, on the aqueous multicomponent mixture used, i.e. the composition of the aqueous multicomponent mixture and/or the further use of the separated recyclable materials. The reactor 1 according to the invention can be adapted accordingly by a person skilled in the art. In preferred embodiments of the reactor 1 according to the invention, for this purpose, the temperature in the separation area 3 is heated in one or more steps by one or more heating elements, such as heat exchangers, through which the compressed aqueous multicomponent mixture flows, and recyclable materials are separated in one or more fractions. For this purpose, the reactor 1 according to the invention comprises one or more heating elements such as heat exchangers and separation and/or collectors of valuable material fractions.

In particularly preferred embodiments, the reactor 1 comprises, in the separation area 3, a plurality of heating elements such as heat exchangers and a plurality of collectors and/or separators for separating a plurality of valuable material fractions from the multicomponent mixture compressed to 25 to 35 MPa.

In particularly preferred embodiments, the reactor 1 comprises in the separation area 3 two means for heating and two means for separating two valuable material fractions from the aqueous multicomponent mixture compressed to 25 to 35 MPa. In one embodiment, the reactor 1 according to the invention comprises in the inner shell 2 a separation area 3 comprising heat exchanger WT1 9 for heating compressed aqueous multicomponent mixture to a temperature of up to 550 degrees Celsius, preferably from 400 to 550 degrees Celsius, and separator A1 for separating a valuable material fraction WF1 from the compressed aqueous multicomponent mixture, in the separation area 3, heat exchanger WT2 12 for heating the compressed aqueous multicomponent mixture to a temperature of up to 400 degrees Celsius, preferably from 200 to 400 degrees Celsius or 300 to 400 degrees Celsius, and separator A2 for separating a valuable material fraction WF2 from the compressed aqueous multicomponent mixture. The heat exchangers WT1 9 and WT2 12, are arranged in such a way that compressed aqueous multicomponent mixture first flows through the heat exchanger WT2 12 for heating up to 400 degrees Celsius and then flows through the heat exchanger WT1 9 for heating up to 550 degrees Celsius. In particularly preferred embodiments of the reactor 1, the heat exchangers WT1 9 and WT2 12 are arranged in a column in such a way that compressed aqueous multicomponent mixture first flows through the heat exchanger WT2 12 for heating up to 400 degrees Celsius, wherein the valuable material fraction WF2 is separated, and then flows through the heat exchanger WT1 9 for heating up to 550 degrees Celsius, wherein the valuable material fraction WT1 is separated. Other alternative heating and separation processes are known to the skilled person.

In particularly preferred embodiments, the reactor 1 comprises in the separation area 3 three means for heating and three means for separating three valuable material fractions from the aqueous multicomponent mixture compressed to 25 to 35 MPa. In particularly preferred embodiments, the reactor 1 according to the invention comprises in the inner shell 2 a separation area 3 comprising heat exchanger WT1 9 and separator A1 for heating compressed aqueous multicomponent mixture to a temperature of up to 550 degrees Celsius, preferably from 400 to 550 degrees Celsius, and for separating a valuable material fraction WF1 from the compressed aqueous multicomponent mixture, in separation area 3 heat exchanger WT2 12 and separator A2 for heating the compressed aqueous multicomponent mixture to a temperature of up to 400 degrees Celsius, preferably from 300 to 400 degrees Celsius, and separating a valuable material fraction WF2 from the compressed aqueous multicomponent mixture, in separator area 3 heat exchanger WT3 13 and separator A3 for heating the compressed aqueous multicomponent mixture to a temperature of up to 300 degrees Celsius, preferably from 200 to 300 degrees Celsius, and separating a valuable material fraction WF3 from the compressed aqueous multicomponent mixture. In the reactor 1, the heat exchangers WT1 9, WT2 12, WT3 13 are interconnected and preferably arranged in a column such that compressed aqueous multicomponent mixture first flows through the heat exchanger WT3 13 for heating up to 300 degrees Celsius, where the valuable material fraction WF3 is separated, then through heat exchanger WT2 12 for heating to up to 400 degrees Celsius, where the valuable material fraction WF2 is separated, then through heat exchanger WT1 9 for heating to up to 550 degrees Celsius, where the valuable material fraction WF1 is separated. Further alternative possibilities for gradual heating of compressed aqueous multicomponent mixture and for separation of valuable material fractions can be implemented by the skilled person in a correspondingly adapted reactor 1 according to the invention.

In preferred embodiments, the reactor 1 according to the invention comprises an inner shell 2 that can be sealed in a pressure-tight manner,

- in the inner shell 2, a separation area 3 comprising heat exchanger WT2 12 and separator A2 for heating compressed aqueous multicomponent mixture to up to 400 degrees Celsius, preferably 300 to 400 degrees Celsius, and for separating a valuable material fraction WF2, heat exchanger WT1 9 and separator A1 for heating compressed aqueous multicomponent mixture to 400 to 550 degrees Celsius and for separating a valuable material fraction WF1, heat exchanger WT2 12 and heat exchanger WT1 9 being connected to one another so that compressed aqueous multicomponent mixture flows first through heat exchanger WT2 12 and then through heat exchanger WT1 9,
- in the inner shell 2 a heating area 4 for heating the compressed aqueous multicomponent mixture to 600 to 700 degrees Celsius after separation of valuable material fraction WF2 and valuable material fraction WF1 comprising preferably one or more heating elements,
- in the inner shell 2 a dwell area 5 for supercritical hydrothermal gasification of the compressed aqueous multicomponent mixture after heating to 600 to 700 degrees Celsius,
- wherein separation area 3, heating area 4 and dwell area 5 are arranged as a column. The reactor 1 may comprise an outer shell 6 surrounding the inner shell 2 and a second pressure space 16 between the inner shell 2 and the outer shell 6.

In preferred embodiments, the reactor 1 according to the invention comprises an inner shell 2 that can be sealed in a pressure-tight manner,

- in the inner shell 2, a separation area 3 comprising heat exchanger WT3 13 and separator A3 for heating compressed aqueous multicomponent mixture to up to 300 degrees Celsius, preferably 200 to 300 degrees Celsius, and for separating a valuable material fraction WF3, heat exchanger WT2 12 and separator A2 for heating compressed aqueous multicomponent mixture to up to 400 degrees Celsius, preferably 300 to 400 degrees Celsius, and for separating a valuable material fraction WF2, heat exchanger WT1 9 and separator A1 for heating compressed aqueous multicomponent mixture to up to 550 degrees Celsius, preferably 400 to 550 degrees Celsius, and for separating a valuable material fraction WF1, wherein heat exchanger WT3 13, heat exchanger WT2 12 and heat exchanger WT1 9 being connected to one another so that compressed aqueous multicomponent mixture flows first through heat exchanger WT3 13, then through heat exchanger WT2 12 and then through heat exchanger WT1 9,
- in the inner shell 2 a heating area 4 for heating the compressed aqueous multicomponent mixture to 600 to 700 degrees Celsius after separation of valuable material fraction WF3, valuable material fraction WF2, valuable material fraction WF1 comprising preferably one or more heating elements,
- in the inner shell 2 a dwell area 5 for supercritical hydrothermal gasification of the compressed aqueous multicomponent mixture after heating to 600 to 700 degrees Celsius,
- wherein separation area 3, heating area 4 and dwell area 5 are arranged as a column. The reactor 1 may comprise an outer shell 6 surrounding the inner shell 2 and a second pressure space 16 between the inner shell 2 and the outer shell 6.

With the reactor 1 according to the invention, inorganic and solid recyclable materials can be separated from aqueous multicomponent mixtures comprising organic and inorganic components and the recyclable materials can be made available for a new utilization. A corresponding process, whereby the recyclable materials are separated in three fractions from aqueous multicomponent mixtures, is known from EP 3 434 382 B1.

The reactor 1 according to the invention is characterized by the fact that recyclable materials (valuable materials) are separated from the aqueous multicomponent mixture before the supercritical hydrothermal gasification is carried out. Thus, on the one hand, recyclable materials are recovered and can be fed to a further utilization (recycling). At the same time, this minimizes blocking of reactor 1 by precipitating salts and solids and extends the service life of reactor 1 and other components. The corrosion of reactor 1 is also significantly reduced.

Recyclable materials in the sense of the invention are, for example, all inorganic constituents contained in the respective multicomponent mixture, for example, phosphorus, for example, in the form of phosphate, nitrogen, for example, in the form of ammonium, metals, for example, in the form of metal ion salts, heavy metals, for example, in the form of heavy metal ion salts, silicon, for example, in the form of sand, calcium, for example, in the form of sand.

Reactor 1 can be used to separate recyclable materials from compressed aqueous multicomponent mixtures in one or more fractions. If recyclable materials are separated (muss eingefügt werden, fehlt in WO 2022/013391, S. 14, letzter Absatz) in the three valuable material fractions WF3, WF2 and WF1 solid substances are enriched in the valuable material fraction WF3, metal salts are enriched in the valuable material fraction WF2 and phosphate and ammonium are enriched in the valuable material fraction WF1. Provided that the multicomponent mixture used as reactant comprises the above-mentioned recyclable materials.

When separating the recyclable materials from compressed aqueous multicomponent mixture in the two valuable material fractions WF2 and WF1, solids and metal salts are enriched in the valuable material fraction WF2 and phosphate and ammonium are enriched in the valuable material fraction WF1. Provided that the multicomponent mixture used as reactant comprises the above-mentioned recyclable materials.

When separating the recyclable materials from compressed aqueous multicomponent mixture in one valuable material fraction WF1, solids, metal salts, phosphate and ammonium are enriched in the valuable material fraction WF1. Provided that the multicomponent mixture used as reactant comprises the above-mentioned recyclable materials.

After separation of the recyclable materials, the aqueous multicomponent mixture consists mainly or only of organic compounds or organic components and water. After separation of the recyclable materials, the compressed aqueous multicomponent mixture is heated in heating area 4 up to the gasification temperature of 600 to 700 degrees Celsius. After separation of the recyclable materials, the compressed aqueous multicomponent mixture first flows through the heating area 4 and then through the dwell area 5, the compressed aqueous multicomponent mixture being gasified to synthesis gas which is dissolved in supercritical water under the conditions of pressure and temperature which exist in the dwell area 5 during normal operation of the reactor 1.

The reactor 1 according to the invention has a heating area 4 in the inner shell 2, through which the compressed aqueous multicomponent mixture flows after separation of the valuable material fraction(s). In the heating area 4, the compressed aqueous multicomponent mixture is heated to at least 600 degrees Celsius, for example 610 or 620 degrees Celsius, preferably 630 or 640 degrees Celsius, particularly preferably 650 or 660 degrees Celsius. In the heating area 4, the compressed aqueous multicomponent mixture is heated to a maximum of 700 degrees Celsius, for example 695 or 690 degrees Celsius, preferably 685 or 680 degrees Celsius, particularly preferably 675 or 670 degrees Celsius. The skilled person can vary the temperature, for example, according to the composition of the aqueous multicomponent mixture used and/or desired composition of the synthesis gas produced during supercritical hydrothermal gasification. In preferred embodiments, the reactor 1 according to the invention comprises one or more heating elements in the heating area 4 for this purpose. The heating in the heating area 4 can be provided by heating elements arranged inside the inner shell 2 in the heating area 4 and/or by heating elements arranged outside the inner shell 2 in the vicinity of the heating area 4.

In a preferred embodiment, the reactor 1 according to the invention comprises a heat exchanger WT4 10 as a heating element in the inner shell 2 in the heating area 4. The reactor 1 according to the invention can comprise further heat exchangers in the heating area 4.

In preferred embodiments, the heating of compressed aqueous multicomponent mixture in the separation area 3 and at least partially in the heating area 4 is carried out with heat exchangers, whereby the heat of the supercritical water in which synthesis gas is dissolved is used to heat compressed aqueous multicomponent mixture. For this purpose, in the reactor 1 according to the invention, the supercritical water in which synthesis gas is dissolved is led from the dwell area 5 and led through the heat exchangers. In preferred embodiments of the reactor 1, this is done through a synthesis gas line 11 arranged inside the reactor 1 and connected to the heat exchangers or through several synthesis gas lines 11 arranged inside the reactor 1 and connected to the heat exchangers. As a result, compressed aqueous multicomponent mixture (=reactant) is heated and at the same time supercritical water, in which synthesis gas is dissolved, is cooled. The conduction of supercritical water, in which synthesis gas is dissolved, inside the reactor 1 and the use of the heat contained in the supercritical water for heating new reactant, makes the reactor 1 according to the invention particularly efficient in terms of energy. The synthesis gas line(s) 11 and the heat exchangers prevent the mixing of compressed aqueous multicomponent mixture (=reactant) with supercritical water in which synthesis gas is dissolved (=product).

In preferred embodiments, the reactor 1 comprises means for regulating the amount of heat that the heating elements, preferably heat exchangers, for example heat exchanger WT4 10 transfers to the compressed aqueous multicomponent mixture in the heating area 4. In preferred embodiments, the reactor 1 comprises means for regulating the amount of heat that the heating elements, preferably heat exchangers transfer to the compressed aqueous multicomponent mixture in the separation area 3. In preferred embodiments, the reactor 1 comprises means for regulating the amount of supercritical water in which synthesis gas is dissolved, which is passed through individual heat exchangers in the heating area 4 and/or in the separation area 3.

A preferred means for regulating the amount of supercritical water in which the synthesis gas is dissolved that is passed through the heat exchanger WT4 10 or bypasses the heat exchanger WT4 10 is a bypass valve. In a particularly preferred embodiment, the reactor 1 according to the invention comprises a heat exchanger WT4 10 in the inner shell 2 in the heating area 4 and a bypass valve, for regulating the amount of supercritical water flowing from the dwell area 5 through the heating area 4 towards the separation area 3. In a particularly preferred embodiment, the reactor 1 according to the invention comprises, in the inner shell 2 in the heating area 4, a heat exchanger WT4 10 and a bypass, which bypasses the heat exchanger WT4 10, and a bypass valve for regulating the amount of supercritical water, in which synthesis gas is dissolved, that flows through the heat exchanger WT 4 10, or, respectively flows past the heat exchanger WT4 10 directly into the heat exchanger WT1 9 (=bypasses the heat exchanger WT4 10). The bypass valve is preferably a component of the heat exchanger WT4 10. In a particularly preferred embodiment, the reactor 1 according to the invention comprises a heat exchanger WT4 10 in the inner shell 2 in the heating area 4, wherein the heat exchanger WT4 10 comprises a bypass valve for regulating the temperature in heat exchanger WT1 9. The bypass valve can be used to regulate the amount of supercritical water that bypasses heat exchanger WT4 10 and is led directly into heat exchanger WT1 9. In this way, the temperature in the WT1 9 heat exchanger can be regulated. The heating of the compressed aqueous multicomponent mixture up to 550 degrees Celsius in the WT1 9 heat exchanger is particularly critical. The bypass and bypass valve can increase the transferable heat flux transferred to compressed aqueous multicomponent mixture in heat exchanger WT1 9 when, with appropriate adjustment of the bypass valve, no or less heat is transferred from supercritical water in which synthesis gas is dissolved to compressed aqueous multicomponent mixture in heat exchanger WT4 10. Due to the larger temperature difference between supercritical water, in which synthesis gas is dissolved, surrounding the heat exchanger and compressed aqueous multicomponent mixture inside the heat exchanger WT1 9, the transferable heat flow in the heat exchanger WT1 9 is increased, if more supercritical water in which synthesis gas is dissolved flows through the bypass from the heating area 4 into the heat exchanger WT1 9 in the separation area 3 than if the supercritical water first flows through the heat exchanger WT4 10 and only then through the heat exchanger WT1 9.

For example, a WT4 10 heat exchanger with a bypass valve passes the supercritical water in which synthesis gas is dissolved completely through the WT4 10 heat exchanger and then through the WT1 9 heat exchanger for heating compressed aqueous multicomponent mixture. In another setting of the bypass valve, only part of the supercritical water in which synthesis gas is dissolved is passed through heat exchanger WT4 10, while the other part of the supercritical water in which synthesis gas is dissolved is passed into the bypass and from there into heat exchanger WT1 9. The bypass can be arranged, for example, between heat exchanger WT4 10 and inner shell 2 of reactor 1. In another setting of the bypass valve, the supercritical water in which synthesis gas is dissolved is completely directed into the bypass and through the heat exchanger WT1 9. These settings are exemplary. Other settings of the bypass valve are possible.

In preferred embodiments of the reactor 1 according to the invention, the bypass and the heat exchanger WT4 10 with bypass valve are arranged in the immediate vicinity of the separation area 3 in the inner shell 2. The bypass and the heat exchanger WT4 10 are connected to the separation area 3. In preferred embodiments of the reactor 1, the heat exchanger WT4 10 with bypass valve is located in the immediate vicinity of the separation area 3 and is flowed through by the compressed aqueous multicomponent mixture heated to 550 degrees Celsius, after the valuable material fraction WT1 has been separated and thereby further heated in the heat exchanger WT4 10 from 550 degrees Celsius, for example to 560 degrees Celsius, 570 degrees Celsius, 580 degrees Celsius, 590 degrees Celsius, 600 degrees Celsius, 610 degrees Celsius, 620 degrees Celsius or more. The reactor 1 according to the invention may comprise further heating elements in the inner shell 2 in the heating area 4, for example one or more electric heaters.

In preferred embodiments, the reactor 1 according to the invention comprises an inner shell 2 that can be sealed in a pressure-tight manner,

- in the inner shell 2, a separation area 3 with one or more heat exchangers for heating compressed aqueous multicomponent mixture to up to 550 degrees Celsius and one or more separators for separating recyclable materials from the compressed aqueous multicomponent mixture,
- in the inner shell 2 a heating area 4 for heating compressed aqueous multicomponent mixture after separation of recyclable material to 600 to 700 degrees Celsius and for temperature regulation in the separation area 4 comprising a heat exchanger WT4 10, a bypass and a bypass valve,
- in the inner shell 2 a dwell area 5 for supercritical hydrothermal gasification of compressed aqueous multicomponent mixture after heating to 600 to 700 degrees Celsius,
- wherein separation area 3, heating area 4 and dwell area 5 are arranged as a column. The reactor 1 may comprise an outer shell 6 surrounding the inner shell 2 and a second pressure space 16 between the inner shell 2 and the outer shell 6.

In preferred embodiments, the reactor 1 according to the invention comprises an inner shell 2 that can be sealed in a pressure-tight manner,

- in the inner shell 2, a separation area 3 comprising heat exchanger WT3 13 and separator A3 for heating compressed aqueous multicomponent mixture to a temperature of up to 300 degrees Celsius and for separating a valuable material fraction WF3, heat exchanger WT2 12 and separator A2 for heating compressed aqueous multicomponent mixture to a temperature of up to 400 degrees Celsius and for separating a valuable material fraction WF2, heat exchanger WT1 9 and separator A1 for heating compressed aqueous multicomponent mixture to a temperature of up to 550 degrees Celsius and for separating a valuable material fraction WF1,
- in the inner shell 2 a heating area 4 for heating the compressed aqueous multicomponent mixture after separation of valuable material fraction WF3, valuable material fraction WF2, valuable material fraction WF1 to 600 to 700 degrees Celsius and for regulating the temperature in the heat exchanger WT1 9 comprising a bypass, a heat exchanger WT4 10 and a bypass valve,
- in the inner shell 2 a dwell area 5 for supercritical hydrothermal gasification of the compressed aqueous multicomponent mixture after heating to 600 to 700 degrees Celsius,
- wherein separation area 3, heating area 4 and dwell area 5 are arranged as a column. The reactor 1 may comprise an outer shell 6 surrounding the inner shell 2 and a second pressure space 16 between the inner shell 2 and the outer shell 6.

In preferred embodiments of the reactor 1 according to the invention, the compressed aqueous multicomponent mixture is heated in the heating area 4 by one or more heating elements arranged outside the inner shell 2 of the reactor 1. In particularly preferred embodiments, the reactor 1 according to the invention comprises an outer shell 6 surrounding the inner shell 2, a second pressure space 16 between the inner shell 2 and the outer shell 6, and one or more heating elements in the second pressure space 16 for heating the compressed aqueous multicomponent mixture to 600 to 700 degrees Celsius in the heating area 4. In preferred embodiments of the reactor 1, the compressed aqueous multicomponent mixture is heated in the heating area 4 by one or more heating elements arranged in the second pressure space 16 between the inner shell 2 and the outer shell 6 of the reactor 1. In preferred embodiments of the reactor 1, the compressed aqueous multicomponent mixture in the heating area 4 is heated by one or more electric heaters arranged in the second pressure space 16 between the inner shell 2 and the outer shell 6 of the reactor 1 and which heat the aqueous multicomponent mixture in the heating area 4 in the inner shell 2 from the outside of the inner shell 2.

In one embodiment, the reactor 1 according to the invention comprises an inner shell 2 that can be sealed in a pressure-tight manner,

- in the inner shell 2, a separation area 3 comprising one or more heat exchangers for heating compressed aqueous multicomponent mixture to up to 550 degrees Celsius and one or more separators for separating recyclable material from the compressed aqueous multicomponent mixture,
- in the inner shell 2 a heating area 4 for heating compressed aqueous multicomponent mixture after separation of recyclable material to 600 to 700 degrees Celsius,
- in the inner shell 2 a dwell area 5 for supercritical hydrothermal gasification of compressed aqueous multicomponent mixture after heating to 600 to 700 degrees Celsius,
- where separation area 3, heating area 4 and dwell area 5 are arranged as a column, an outer shell 6 surrounding inner shell 2 and a second pressure space 16 between inner shell 2 and outer shell 3, outside the inner shell 2, one or more heating elements, arranged in the second pressure space 16, for heating compressed aqueous multicomponent mixture in the heating area 4.

In further embodiments, the reactor 1 according to the invention comprises an inner shell 2 that can be sealed in a pressure-tight manner, in the inner shell 2, a separation area 3 comprising heat exchanger WT3 13 and separator A3 for heating compressed aqueous multicomponent mixture to up to 300 degrees Celsius and for separating a valuable material fraction WF3, heat exchanger WT2 12 and separator A2 for heating compressed aqueous multicomponent mixture to up to 400 degrees Celsius and for separating a valuable material fraction WF2, heat exchanger WT1 9 and separator A1 for heating compressed aqueous multicomponent mixture to up to 550 degrees Celsius and for separating a valuable material fraction WF1, in the inner shell 2 a heating area 4 for heating the compressed aqueous multicomponent mixture after separation of valuable material fraction WF3, valuable material fraction WF2, valuable material fraction WF1 to 600 to 700 degrees Celsius a heat exchanger WT4 10 and for regulating the temperature in the heat exchanger WT1 9 comprising a bypass, and a bypass valve, in the inner shell 2 a dwell area 5 for supercritical hydrothermal gasification of the compressed aqueous multicomponent mixture after heating to 600 to 700 degrees Celsius, wherein separation area 3, heating area 4 and dwell area 5 are connected to each other and arranged as a column, with separation area 3 at the lower end of the column and dwell area 5 at the upper end of the column, an outer shell 6 surrounding the inner shell 2, between inner shell 2 and outer shell 6 a second pressure space 16, wherein one or more heating elements are arranged in the second pressure space 16 in the region surrounding the heating area 4 for heating the compressed aqueous multicomponent mixture in the heating area 4 to 600 to 700 degrees Celsius.

In preferred embodiments, the reactor 1 comprises a superheater in the heating area 4. In preferred embodiments, the reactor 1 comprises in the heating area 4 a tubular section that is heated from the outside, preferably electrically heated. In preferred embodiments, the reactor 1 in the heating area 4 comprises a heat exchanger WT5, preferably a tubular heat exchanger. In preferred embodiments, only a portion of the heating area 4 comprises a superheater and/or a tubular section that is externally heated and/or a tubular heat exchanger. In preferred embodiments of the reactor 1, at least a part of the heating area 4 comprises an annular gap, which is designed, for example, as a superheater, tubular section, tube heat exchanger. In this part of the heating area 4, in which the annular gap, for example the superheater, the pipe section, the pipe heat exchanger, is arranged, the compressed aqueous multicomponent mixture is passed through an annular gap, which is heated from the outside and from the inside. The compressed aqueous multicomponent mixture flowing through the annular gap in the heating area 4 is heated from the outside, preferably electrically, for example by the one or more heating elements arranged in the second pressure space 16 between the inner shell 2 and the outer shell 6 of the reactor 1, and from the inside by the supercritical water in which synthesis gas is dissolved. The different phases are separated from each other by the annular gap.

In preferred embodiments, the supercritical water in which synthesis gas is dissolved is passed through the synthesis gas line 11, which is arranged inside the inner shell 2 in the heating area 4. In preferred embodiments of the reactor 1, the synthesis gas line 11 passes through the heating area 4 and has, at least in parts of the heating area 4, a diameter almost equal to the diameter of the inner shell 2 in this area. Thereby, an annular gap remains between synthesis gas line 11 and inner shell 2. The compressed aqueous multicomponent mixture flows through the annular gap between synthesis gas line 11 and inner shell 2 in the heating area 4 and is thereby heated from the inside by the supercritical water in which synthesis gas is dissolved that is passed through the synthesis gas line 11. The compressed aqueous multicomponent mixture flows through the annular gap between the synthesis gas line 11 and the inner shell 2 in the heating area 4 and is thereby heated from the outside by heating elements arranged in the second pressure space 16. This arrangement in the heating area 4 has the advantage that a large surface area is available for heat transfer. As a result, the compressed aqueous multicomponent mixture can be heated to the temperature for supercritical hydrothermal gasification.

Preferably, the area in the second pressure space 16 in which one or more heating elements are arranged surrounds the annular gap in the heating area 4 for heating the compressed aqueous multicomponent mixture in the annular gap while the compressed aqueous multicomponent mixture flows through the annular gap in the heating area 4.

The diameter of the annular gap is the distance from the outer wall of the synthesis gas line 11 to the inner wall of the inner shell 2. The annular gap may have a different diameter at different locations of the reactor 1. In preferred embodiments of the reactor 1, the annular gap has a smaller diameter in the heating area 4 than in the dwell area 5. The annular gap may also have different diameters within the heating area 4.

In preferred embodiments of the reactor 1, the annular gap in the heating area 4 has a diameter of at most 30 mm, for example 25 mm or 20 mm or less, preferably 15 mm or 10 mm or less, particularly preferably 4 to 6 mm or less. In preferred embodiments of the reactor 1, the annular gap in the heating area 4 has at least partially a diameter of at most 30 mm, for example 25 mm or 20 mm or less, preferably 15 mm or 10 mm or less, particularly preferably 4 to 6 mm or less. In preferred embodiments of the reactor 1, the annular gap in the heating area 4 has a diameter of at most 30 mm, for example 25 mm or 20 mm or less, preferably 15 mm or 10 mm, particularly preferably 4 to 6 mm or less and the compressed aqueous multicomponent mixture is heated in the heating area 4 by one or more heating elements, which are arranged in the second pressure space 16 between the inner shell 2 and the outer shell 6 of the reactor 1 and heat the compressed aqueous multicomponent mixture, as it flows through the annular gap, to 600 to 700 degrees Celsius. In preferred embodiments of the reactor 1, the annular gap in the heating area 4 has at least partially a diameter of at most 30 mm, for example 25 mm or 20 mm or less, preferably 15 mm or 10 mm or less, particularly preferably 4 mm to 6 mm or less, and the compressed aqueous multicomponent mixture is at least partially heated in the annular gap in the heating area 4 by one or more heating elements, which are arranged in the second pressure space 16 between the inner shell 2 and the outer shell 6 of the reactor 1 and the compressed aqueous multicomponent mixture is heated to 600 to 700 degrees Celsius as it flows through the annular gap in the heating area 4. For example, the reactor 1 comprises one, two, three, four, five, six, seven, eight, nine, ten or more, for example 14, 18, 20, 28, 30 or more heating elements, preferably electric heating elements, arranged in the second pressure space 16 in the area surrounding the annular gap in the heating area 4.

Due to the small diameter of the annular gap in the heating area 4 or at least in parts of the heating area 4, the flow velocity of the compressed aqueous multicomponent mixture in this part of the heating area 4 is very high. The annular gap in the heating area 4 is dimensioned in such a way that there is optimum heat transfer into the compressed aqueous multicomponent mixture. In different embodiments of the reactor 1, the annular gap, in particular the diameter of the annular gap in the heating area 4 is adjusted depending on the aqueous multicomponent mixture used as reactant and the optimal heat transport.

The small diameter of the annular gap in the heating area 4 through which the compressed aqueous multicomponent mixture flows and the large area for transferring heat to the compressed aqueous multicomponent mixture in the heating area 4 or at least in parts of the heating area 4 enables good heat transfer and thus rapid and complete heating of flowing compressed aqueous multicomponent mixture to up to 700 degrees Celsius, preferably to up to 680 degrees Celsius. Due to the high flow rate of compressed aqueous multicomponent mixture in the heating area 4 or at least in parts of the heating area 4, corrosion of the reactor 1 is minimized. Depending on the composition of the aqueous multicomponent mixture, the diameter of the annular gap and the arrangement of the heating elements in the heating area 4, the flow rate of aqueous compressed multicomponent mixture in the heating area 4 can be varied.

In preferred embodiments, the reactor 1 according to the invention comprises an inner shell 2 that can be sealed in a pressure-tight manner,

- in the inner shell 2, a separation area 3 comprising one or more heating elements for heating compressed aqueous multicomponent mixture up to 550 degrees Celsius and one or more separators for separating recyclable material,
- in the inner shell 2 a heating area 4 for heating the compressed aqueous multicomponent mixture after separation of recyclable material to 600 to 700 degrees Celsius comprising a tubular heat exchanger WT5, a bypass, a heat exchanger WT4 10 and a bypass valve, in the inner shell 2 a dwell area 5 for supercritical hydrothermal gasification of the compressed aqueous multicomponent mixture after heating to 600 to 700 degrees Celsius,
- wherein separation area 3, heating area 4 and dwell area 5 are connected to each other and arranged as a column, with the separation area 3 at the lower end of the column and the dwell area 5 at the upper end of the column, wherein the heat exchanger WT4 10 is adjacent to the separation area 3 and the tubular heat exchanger WT5 is connected on one side to the bypass and the heat exchanger WT4 10 and on the other side to the dwell area 5. Preferably, the tubular heat exchanger is arranged in an upright column in the heating area 4 above the heat exchanger WT4 10.

In preferred embodiments, the reactor 1 according to the invention comprises an inner shell 2 that can be sealed in a pressure-tight manner,

- in the inner shell 2 a separation area 3 comprising one or more heating elements for heating compressed aqueous multicomponent mixture up to 550 degrees Celsius and one or more separators for separating recyclable material,
- in the inner shell 2 a heating area 4 for heating the compressed aqueous multicomponent mixture after separation of recyclable material to 600 to 700 degrees Celsius comprising a synthesis gas line 11,
- in the inner shell 2 a dwell area 5 for supercritical hydrothermal gasification of the compressed aqueous multicomponent mixture after heating to 600 to 700 degrees Celsius,
- wherein separation area 3, heating area 4 and dwell area 5 are connected to each other and arranged as a column, with separation area 3 at the lower end of the column and dwell area 5 at the upper end of the column,
- wherein the synthesis gas line 11 is used to heat the compressed aqueous multicomponent mixture in a portion of the heating area 4 or
- forms an annular gap with the inner shell 2 in the entire heating area 4 and wherein the synthesis gas line 11 is connected on one side to the bypass and the heat exchanger WT4 10 and on the other side to the dwell area 5

In preferred embodiments, the reactor 1 according to the invention comprises an inner shell 2 that can be sealed in a pressure-tight manner,

- in the inner shell 2 a separation area 3 comprising one or more heating elements for heating compressed aqueous multicomponent mixture up to 550 degrees Celsius and one or more separators for separating recyclable material,
- in the inner shell 2 a heating area 4 for heating the compressed aqueous multicomponent mixture after separation of recyclable material to 600 to 700 degrees Celsius comprising a synthesis gas line 11,
- in the inner shell 2 a dwell area 5 for supercritical hydrothermal gasification of the compressed aqueous multicomponent mixture after heating to 600 to 700 degrees Celsius,
- wherein separation area 3, heating area 4 and dwell area 5 are connected to one another and arranged as a column, with the separation area 3 at the lower end of the column and the dwell area 5 at the upper end of the column, wherein the synthesis gas line 11 forms an annular gap with the inner shell 2 in part of the heating area 4 or in the entire heating area 4,
- an outer shell 6 surrounding the inner shell 2,
- between inner shell 2 and outer shell 6 a second pressure space 16,
- comprising in the second pressure space 16 an area in which one or more heating elements, preferably electric heating elements, are arranged for heating the compressed aqueous multicomponent mixture and which surrounds the annular gap in the heating area 4 for heating the compressed aqueous multicomponent mixture as it flows through the annular gap in the heating area 4.

In preferred embodiments, the reactor 1 according to the invention comprises an inner shell 2 that can be sealed in a pressure-tight manner,

- in the inner shell 2, a separation area 3 comprising one or more heating elements for heating compressed aqueous multicomponent mixture up to 550 degrees Celsius and one or more separators for separating recyclable material, in the inner shell 2 a heating area 4 for heating the compressed aqueous multicomponent mixture after separation of recyclable material to 600 to 700 degrees Celsius comprising a synthesis gas line 11, a bypass, a heat exchanger WT4 10 and a bypass valve, in the inner shell 2 a dwell area 5 for supercritical hydrothermal gasification of the compressed aqueous multicomponent mixture after heating to 600 to 700 degrees Celsius, wherein separation area 3, heating area 4 and dwell area 5 are connected to each other and arranged as a column, with separation area 3 at the lower end of the column and dwell area 5 at the upper end of the column, wherein the synthesis gas line 11 forms an annular gap with the inner shell 2 for heating the compressed aqueous multicomponent mixture in a part of the heating area 4 or in the entire heating area 4, an outer shell 6 surrounding the inner shell 2, between inner shell 2 and outer shell 6 a second pressure space 16, comprising in the second pressure space 16 an area in which one or more heating elements, preferably electric heating elements, are arranged and which surrounds the annular gap in the heating area 4 for heating the compressed aqueous multicomponent mixture as it flows through the annular gap in the heating area 4. The bypass and the heat exchanger WT4 10 are preferably arranged above the separation area 3 and are connected to the heat exchanger or heat exchangers in the separation area 3. In preferred embodiments of the reactor 1, the synthesis gas line 11 is arranged adjacent to the heat exchanger WT4 10 in the heating area 4. The syngas line 11 is connected to the heat exchanger WT4 10 and the bypass. The supercritical water in which synthesis gas is dissolved is passed through the synthesis gas line 11 into the heat exchanger WT4 10 and/or the bypass and from there into the separation area 3. In preferred embodiments of the reactor 1, the annular gap is arranged in the upright column in the heating area 4 above the heat exchanger WT4 10. Preferably, the bypass and heat exchanger WT4 10 are arranged adjacent to each other in the upright column. Preferably, the annular gap is arranged in the upright column in the heating area 4 above the bypass and the heat exchanger WT4 10.

In further embodiments, the reactor 1 according to the invention comprises an inner shell 2 that can be sealed in a pressure-tight manner, in the inner shell 2, a separation area 3 comprising heat exchanger WT3 13 and separator A3 for heating compressed aqueous multicomponent mixture to up to 300 degrees Celsius and for separating a valuable material fraction WF3, heat exchanger WT2 12 and separator A2 for heating compressed aqueous multicomponent mixture to up to 400 degrees Celsius and for separating a valuable material fraction WF2, heat exchanger WT1 9 and separator A1 for heating compressed aqueous multicomponent mixture to up to 550 degrees Celsius and for separating a valuable material fraction WF1, in the inner shell 2 a heating area 4 for heating the compressed aqueous multicomponent mixture after separation of recyclable material to 600 to 700 degrees Celsius comprising a synthesis gas line 11, a bypass, heat exchanger WT4 10, a bypass valve, in the inner shell 2 a dwell area 5 for supercritical hydrothermal gasification of the compressed aqueous multicomponent mixture after heating to 600 to 700 degrees Celsius, wherein separation area 3, heating area 4 and dwell area 5 are interconnected and arranged as an upright column, wherein the synthesis gas line 11 forms an annular gap with the inner shell 2 in part of the heating area 4 or in the entire heating area 4, wherein the annular gap has a diameter of less than 30 mm, preferably less than 20 mm, wherein the annular gap in the upright column is located above the bypass and the heat exchanger WT4 10, an outer shell 6 surrounding the inner shell 2, between inner shell 2 and outer shell 6 a second pressure space 16, comprising in the second pressure space 16 an area in which one or more electric heating elements are arranged and which surrounds the annular gap in the heating area 4 for heating the compressed aqueous multicomponent mixture as it flows through the annular gap in the heating area 4.

In preferred embodiments of the reactor 1, the heating area 4 has a length of 2 meters to 10 meters, preferably 3 meters to 5 meters. Preferably, the reactor 1 comprises an annular gap with a diameter of less than 30 mm, for example 25 mm or 20 mm or less, preferably 15 mm or 10 mm or less, preferably 4 mm to 6 mm or less. In preferred embodiments of the reactor 1, the heating area 4 has a length of 3 meters to 5 meters and comprises an annular gap. In preferred embodiments of the reactor 1, the heating area 4 has a length of 5 meters or less and the annular gap has a diameter of less than 30 mm, for example 25 mm or 20 mm or less, preferably 15 mm or 10 mm or less and comprises a second pressure space 16, preferably comprising one or more electric heaters. In preferred embodiments of the reactor 1, the heating area 4 has a length of 3 meters to 5 meters and comprises in the heating area a heat exchanger WT4 9 and an annular gap with a diameter of less than 20 mm or 15 mm, preferably 4 mm to 10 mm or less, arranged above the heat exchanger WT4 9 and in the second pressure space 16 one or more heaters for heating compressed aqueous multicomponent mixture in the annular gap.

In heating area 4, the compressed aqueous multicomponent mixture is heated to 600 to 700 degrees Celsius, preferably about 600 to 700 degrees Celsius, for example, 570 degrees Celsius, 580 degrees Celsius, 590 degrees Celsius, 600 degrees Celsius, 610 degrees Celsius, 620 degrees Celsius, 630 degrees Celsius, 640 degrees Celsius, 650 degrees Celsius, 660 degrees Celsius, 670 degrees Celsius, 680 degrees Celsius, 690 degrees Celsius, 700 degrees Celsius, 705 degrees Celsius, 710 degrees Celsius. Supercritical hydrothermal gasification can be carried out, for example, by adding catalysts at temperatures lower than 600 to 700 degrees Celsius.

The reactor 1 according to the invention comprises a dwell area 5 in the inner shell 2 for supercritical hydrothermal gasification of the compressed aqueous multicomponent mixture. The dwell area 5 is connected to the heating area 4. The compressed aqueous multicomponent mixture flows into the dwell area 5 after heating to 600 to 700 degrees Celsius and flows through the dwell area 5 in 0.5 to 7 minutes, preferably in 1 to 5 minutes, particularly preferably in 2 to 3 minutes. In this process, the compressed aqueous multicomponent mixture or the organic compounds and organic components contained in the aqueous multicomponent mixture are gasified under supercritical reaction conditions to form synthesis gas. In supercritical hydrothermal gasification, the supercritical water acts as a reaction medium and as a reactant for the organic compounds and constituents contained in the aqueous multicomponent mixture. The organic compounds and constituents are converted to synthesis gas during supercritical hydrothermal gasification. The synthesis gas (=gasification product or product) is dissolved in supercritical water at pressures of 25 to 35 MPa and the temperatures present in the dwell range 5.

The dwell area 5 is connected to the synthesis gas line 11. In particularly preferred embodiments of the reactor 1, the inner shell 2 in the dwell area 5 comprises the synthesis gas line 11. Preferably, the synthesis gas line 11 is arranged inside the dwell area 5. In this case, the synthesis gas line 11 projects from the heating area 4 into the dwell area 5 almost as far as the upper end of the dwell area 5, for example as far as the upper third or upper quarter, preferably as far as the upper fifth or upper sixth of the dwell area 5, particularly preferably as far as the upper seventh or upper eighth of the dwell area 5. The upper end of the dwell area 5 is that part of the dwell area 5 which is furthest away from the heating area 4. The end of the synthesis gas line 11 has one or more openings at the upper end. Preferably, the synthesis gas line 11 is open at the upper end. In particularly preferred embodiments of the reactor 1, the inner shell 2 in the dwell area 5 comprises the synthesis gas line 11 open at the end projecting into the dwell area 5. In preferred embodiments of the reactor 1, the inner shell 2 in the dwell area 5 has the shape of a tube and at the end of the dwell area 5 a bobbin bow and comprises the synthesis gas line 11 in the interior of the dwell area 5, which extends at least into the upper third, preferably at least into the upper quarter of the dwell area 5. Through the open end or the one or more openings, the synthesis gas line 11 is connected to the dwell area 5. In particularly preferred embodiments of the reactor 1, the inner shell 2 in the dwell area 5 comprises the synthesis gas line 11, wherein the synthesis gas line 11 forms an annular gap with the inner shell 2 in a part of the dwell area 5 or in the entire dwell area 5 and the annular gap in the dwell area 5 at least partially has a diameter of at least 50 mm and wherein the synthesis gas line 11 has at least one opening in the dwell area 5 for the introduction of supercritical water in which synthesis gas is dissolved.

Due to the design and arrangement of the synthesis gas line 11 in the heating area 4 and in the dwell area 5, aqueous multicomponent mixture flows from the heating area 4 into the dwell area 5. In particularly preferred embodiments of the reactor 1, the synthesis gas line 11 has a smaller diameter in the dwell area 5 than in the heating area 4. In particularly preferred embodiments of the reactor 1, the annular gap has a larger diameter in the dwell area 5 than in the heating area 4. In preferred embodiments of the reactor 1, the diameter available for the compressed aqueous multicomponent mixture to flow through (the annular gap) widens at the transition from the heating area 4 to the dwell area 5, for example the transition has the shape of a funnel, with the wide end of the funnel facing the dwell area 5. In preferred embodiments of the reactor 1, the dwell area 5 has a diameter that is larger than the diameter of the heating area 4. In preferred embodiments of the reactor 1, the diameter in the dwell area 5 is 2 m or less, for example 1.5 m or 1 m, preferably 500 mm to 900 mm, more preferably 600 to 800 mm, for example 750 mm, 700 mm or 650 mm. In preferred embodiments of the reactor 1 the diameter of the annular gap in the dwell area 5 is 1 m or less, for example 700 mm or less, preferably 50 to 500 mm, for example 100 to 400 mm, preferably 150 mm to 300 mm, for example 150 mm, 200 mm, 250 mm, 300 mm. In preferred embodiments, the dwell area 5 in the reactor 1 has a length of 0.5 m to 2 m, for example 0.6 m to 1.8 m or 0.7 to 1.5 m, preferably 0.8 to 1.1 m. In preferred embodiments of the reactor 1, the inner shell 2 has the shape of a tube in the dwell area 5 and a bobbin bow at the end of the dwell area 5.

The expanded diameter in the dwell area 5 reduces the flow velocity of the compressed aqueous multicomponent mixture. In the dwell area 5, the flow velocity of the compressed aqueous multicomponent mixture approaches zero. As a result, large hydrocarbons or hydrocarbons with strong bonds such as long-chain hydrocarbons and aromatics have a longer dwell time than smaller and shorter hydrocarbons. By this design of reactor 1, supercritical hydrothermal gasification performed in the absence of oxygen is complete for all organic compounds contained in the compressed aqueous multicomponent mixture. The organic compounds contained in the compressed aqueous multicomponent mixture are converted to a synthesis gas comprising predominantly or almost exclusively hydrogen, carbon dioxide, methane and water. The synthesis gas produced by supercritical hydrothermal gasification from the compressed aqueous multicomponent mixture has a lower density than the compressed aqueous multicomponent mixture and rises in the dwell area 5 in the upright column. In this case, the synthesis gas is dissolved in the supercritical water. The synthesis gas dissolved in supercritical water is diverted at the upper end of the dwell area 5 and flows into the opening or openings of the synthesis gas line 11, which is arranged with its upper end comprising one or more openings in the dwell area 5.

In further embodiments, the reactor 1 according to the invention comprises an inner shell 2 that can be sealed in a pressure-tight manner,

- in the inner shell 2 a separation area 3 comprising one or more heat exchangers and separators for heating compressed aqueous multicomponent mixture up to 550 degrees Celsius and for separating recyclable material,
- in the inner shell 2 a heating area 4 for heating the compressed aqueous multicomponent mixture after separation of recyclable material to 600 to 700 degrees comprising a synthesis gas line 11,
- in the inner shell 2 a dwell area 5 for supercritical hydrothermal gasification of the compressed aqueous multicomponent mixture after heating to 600 to 700 degrees Celsius comprising the synthesis gas line 11,
- wherein separation area 3, heating area 4 and dwell area 5 are connected to each other and arranged as an upright column, with separation area 3 at the lower end of the column and dwell area 5 at the upper end of the column,
- wherein the synthesis gas line 11 forms an annular gap with the inner shell 2 in a part of the heating area 4 or in the entire heating area 4 and a part of the dwell area 5,
- wherein the annular gap in the heating area 3 has a diameter of less than 30 mm, for example 25 mm, 20 mm or 15 mm or less, preferably 4 to 10 mm, and the annular gap in the dwell area 5 has a diameter of 150 mm or more, preferably 200 to 300 mm,
- wherein the synthesis gas line 11 is arranged in the dwell area 5 and has at least one opening at the end, wherein the end of the synthesis gas line 11 is arranged in the upper third of the dwell area 5.

In further embodiments, the reactor 1 according to the invention comprises an inner shell 2 that can be sealed in a pressure-tight manner, in the inner shell 2, a separation area 3 comprising heat exchanger WT3 13 and separator A3 for heating compressed aqueous multicomponent mixture to up to 300 degrees Celsius and for separating a valuable material fraction WF3, heat exchanger WT2 12 and separator A2 for heating compressed aqueous multicomponent mixture to up to 400 degrees Celsius and for separating a valuable material fraction WF2, heat exchanger WT1 9 and separator A1 for heating compressed aqueous multicomponent mixture to up to 550 degrees Celsius and for separating a valuable material fraction WF1, in the inner shell 2 a heating area 4 for heating the compressed aqueous multicomponent mixture after separation of valuable fractions WF3, WF2, WF1 to 600 to 700 degrees Celsius comprising a synthesis gas line 11, a bypass, a heat exchanger WT4 10 and a bypass valve, in the inner shell 2 a dwell area 5 for supercritical hydrothermal gasification of the compressed aqueous multicomponent mixture after heating to 600 to 700 degrees Celsius comprising the synthesis gas line 11, wherein separation area 3, heating area 4 and dwell area 5 are interconnected and arranged as an upright column, wherein the synthesis gas line 11 forms an annular gap with the inner shell 2 in part of the heating area 4 or in the entire heating area 4, wherein the annular gap in the heating area 4 has a diameter of less than 20 mm, for example 15 mm, or less, for example 10 mm, wherein the annular gap in the heating area 4 is arranged in the upright column above the bypass and the heat exchanger WT4 10 and is connected to them, wherein the synthesis gas line 11 forms an annular gap with the inner shell 2 in a part of the dwell area 5 and the annular gap in the dwell area 5 has at least partially a diameter of at least 150 mm, an outer shell 6 surrounding the inner shell 2, between inner shell 2 and outer shell 6 a second pressure space 16, comprising in the second pressure space 16 an area in which one or more electric heating elements are arranged for heating the compressed aqueous multicomponent mixture to the temperature of the supercritical hydrothermal gasification and which surrounds the annular gap in the heating area 4 and optionally at least partially in the dwell area 5, wherein the synthesis gas line 11 projects at least into the upper third of the dwell area 5 and comprises at least one opening in the dwell area 5. Preferably, at the transition from the heating area 4 into the dwell area 5, the synthesis gas line 11 has the shape of a funnel with the wide side of the funnel facing the dwell area 5.

In preferred embodiments of the reactor 1 according to the invention, the arrangement, shape and dimensions (diameter and length) of heating area 4, dwell area 5 and synthesis gas line 11 in the column are selected in such a way that the compressed aqueous multicomponent mixture, when flowing through heating area 4, is heated to the temperature of supercritical hydrothermal gasification, namely 600 to 700 degrees Celsius, expands as it passes into the dwell area 5 and flows through the dwell area 5 within 0.5 to 7 min, preferably within 1 to 5 minutes, for example within 2 to 3 minutes. Depending on the composition of compressed aqueous multicomponent mixture, individual components contained in the compressed aqueous multicomponent mixture remain in the dwell area 5 longer or shorter than others. In dwell area 5, the compressed aqueous multicomponent mixture is hydrothermally gasified under supercritical conditions, with synthesis gas being formed as the gasification product, which is dissolved in supercritical water under these pressure and temperature conditions. The supercritical water in which synthesis gas is dissolved is diverted into the synthesis gas line 11 at the end of the dwell area 5. In preferred embodiments, the inner shell 2 at the end of the dwell area 5 has the shape of a bobbin bow for this purpose.

In preferred embodiments of the reactor 1, the synthesis gas line 11 is located inside the dwell area 5 and inside the heating area 4. In preferred embodiments of the reactor 1, the synthesis gas line 11 begins inside the dwell area 5 below the upper end of the dwell area 4, for example below the bobbin bow, the synthesis gas line 11 being open at this end so that generated synthesis gas dissolved in supercritical water flows into the synthesis gas line 11 when the reactor 1 is used as intended. In preferred embodiments, the reactor 1 comprises a synthesis gas line 11 open at the upper end, which is arranged within the inner shell 2 of the reactor 1 in the dwell area 5 and leads through the dwell area 5 and through the heating area 4, wherein the diameter of the synthesis gas line 11 increases (expands) as the synthesis gas line 11 passes from the dwell area 5 into the heating area 4.

In intended use of the reactor 1, the synthesis gas line 11 serves to conduct supercritical water, in which synthesis gas is dissolved, through the reactor 1. In intended use, the synthesis gas line 11 also serves to separate supercritical water, in which synthesis gas is dissolved, from compressed aqueous multicomponent mixture flowing in the first pressure space 15 within the inner shell 2 of the reactor 1, first through the heating area 4 and then into the dwell area 5. In particular embodiments of the reactor 1, the synthesis gas line 11 directs the supercritical water in which synthesis gas is dissolved into the heat exchanger WT4 10 and optionally into the bypass, if present. In particular embodiments of the reactor 1, the synthesis gas line 11 conducts the supercritical water in which synthesis gas is dissolved into the heat exchanger WT1 9. In particularly preferred embodiments of the reactor 1, the synthesis gas line 11 conducts the supercritical water in which synthesis gas is dissolved into the top heat exchanger in the column, for example heat exchanger WT4 10 or heat exchanger WT1 9. In preferred embodiments of the reactor 1 according to the invention, the reactor 1 comprises a heat exchanger WT4 10 and the synthesis gas line 11 opens into heat exchanger WT4 10 and is connected to the heat exchanger WT4 10, preferably the synthesis gas line 11 opens into heat exchanger WT4 10 with bypass valve and is connected to the heat exchanger WT4 10 with bypass valve and the bypass for regulating the synthesis gas flow and temperature in the heat exchangers WT4 10 and WT1 9. In preferred embodiments of the reactor 1, the dwell area 5 is connected to the synthesis gas line 11, and the synthesis gas line 11 leads to the discharge of supercritical water in which synthesis gas is dissolved and to the heating of compressed aqueous multicomponent mixture from the dwell area 5 first through the heating area 4, through the heat exchanger WT4 10 with bypass valve and through the bypass, into the separation area 3 through the heat exchanger WT1 9, if present through the heat exchanger WT2 12, if present through the heat exchanger WT3 13 for discharging the supercritical water in which synthesis gas is dissolved and for heating compressed aqueous multicomponent mixture. Compressed aqueous multicomponent mixture, when flowing through the annular gap formed by the inner shell 2 and the synthesis gas line, is heated (warmed) at the boundary with the synthesis gas line by supercritical water in which synthesis gas is dissolved and at the boundary with the inner shell 2, by the heating elements arranged in the second pressure space 16. This allows the compressed aqueous multicomponent mixture to be heated to the temperature of 600 to 700 degrees Celsius necessary for supercritical hydrothermal gasification. In preferred embodiments of the reactor 1, the synthesis gas line 11 is a tubular heat exchanger WT5 and connected to heat exchanger WT4 10 with bypass valve and the bypass. In preferred embodiments, the synthesis gas line 11 is connected to the bypass and the bypass valve. The synthesis gas line 11 may be a tubular heat exchanger WT5.

When reactor 1 is used as intended, synthesis gas line 11 is a means of countercurrently heating compressed aqueous multicomponent mixture with supercritical water, in which synthesis gas is dissolved and which is generated during supercritical hydrothermal gasification, without the phases mixing. In this energetically advantageous process control, the process heat of the supercritical hydrothermal gasification is used to heat compressed aqueous multicomponent mixture (=new reactant). At the same time, this cools the supercritical water in which synthesis gas is dissolved. In preferred embodiments of the invention, the compressed aqueous multicomponent mixture has a temperature of about 100 degrees Celsius or less, for example 50 to 70 degrees Celsius, preferably 60 degrees Celsius, when entering the inner shell 2 of the reactor 1, and the water in which synthesis gas is dissolved has a temperature of about 110 degrees Celsius or less, for example 60 to 80 degrees Celsius, preferably 70 degrees Celsius, when exiting the inner shell 2.

In further embodiments, the reactor 1 according to the invention comprises an inner shell 2 that can be sealed in a pressure-tight manner,

- in the inner shell 2, a separation area 3 comprising one or more heat exchangers and separators for heating compressed aqueous multicomponent mixture to up to 550 degrees Celsius and for separating recyclable materials,
- in the inner shell 2 a heating area 4 for heating the compressed aqueous multicomponent mixture after separation of recyclable materials to 600 to 700 degrees comprising a synthesis gas line 11,
- in the inner shell 2 a dwell area 5 for supercritical hydrothermal gasification of the compressed aqueous multicomponent mixture after heating to 600 to 700 degrees Celsius comprising the synthesis gas line 11,
- wherein separation area 3, heating area 4 and dwell area 5 are interconnected and arranged as an upright column,
- wherein the synthesis gas line 11 forms an annular gap with the inner shell 2 in part of the heating area 4 or in the entire heating area 4,
- wherein the synthesis gas line 11 forms an annular gap with the inner shell 2 in a part of the dwell area 5 or in the entire dwell area 5, and the annular gap in the dwell area 5 has at least partially a diameter of at least 150 mm,
- wherein the synthesis gas line 11 for introducing supercritical water in which synthesis gas is dissolved has at least one opening in the dwell area 5,
- the synthesis gas line 11 for heating compressed aqueous multicomponent mixture leads from the dwell area 5 through the heating area 4, the synthesis gas line 11 being connected to the heat exchanger WT4 10 with bypass valve and the bypass.

In further embodiments of the reactor 1 according to the invention, the synthesis gas line 11 leads from the heat exchanger WT4 10, through the heat exchanger WT1 9, if present through the heat exchanger WT2 12, if present through the heat exchanger WT3 13, for heating compressed aqueous multicomponent mixture up to 550 degrees Celsius. In further embodiments of the reactor 1 according to the invention, the synthesis gas line 11 is connected to the heat exchanger WT4 10, the heat exchanger WT4 10 is connected to the heat exchanger WT1 9, the heat exchanger WT1 9 is connected to the heat exchanger WT2 12, the heat exchanger WT2 12 is connected to the heat exchanger WT3 13 for heating compressed aqueous multicomponent mixture with the supercritical water in which synthesis gas is dissolved. In further embodiments of the reactor 1 according to the invention, the synthesis gas line 11 is connected to the bypass and the heat exchanger WT4 10, the bypass and the heat exchanger WT4 10 are connected to the heat exchanger WT1 9, the heat exchanger WT1 9 is connected to the heat exchanger WT2 12, the heat exchanger WT2 12 is connected to the heat exchanger WT3 13 for heating compressed aqueous multicomponent mixture in counterflow with the supercritical water in which synthesis gas is dissolved, wherein the synthesis gas line 11 and the heat exchangers prevent the compressed aqueous multicomponent mixture and the supercritical water in which synthesis gas is dissolved from mixing. Heat is transferred from the supercritical water in which synthesis gas is dissolved to the compressed aqueous multicomponent mixture. The supercritical water in which synthesis gas is dissolved is cooled and the compressed aqueous multicomponent mixture is heated.

For example, the reactor 1 according to the invention comprises an inner shell 2 that can be sealed in a pressure-tight manner,

- in the inner shell 2, a separation area 3 comprising heat exchanger WT3 13 and separator A3 for heating compressed aqueous multicomponent mixture to up to 300 degrees Celsius and for separating a valuable material fraction WF3, heat exchanger WT2 12 and separator A2 for heating compressed aqueous multicomponent mixture to up to 400 degrees Celsius and for separating a valuable material fraction WF2, heat exchanger WT1 9 and separator A1 for heating compressed aqueous multicomponent mixture to up to 550 degrees Celsius and for separating a valuable material fraction WF1,
- in the inner shell 2 a heating area 4 for heating the compressed aqueous multicomponent mixture after separation of the valuable fractions WF3, WF2, and WF1 to 600 to 700 degrees Celsius comprising a synthesis gas line 11, a bypass, a heat exchanger WT4 10 and a bypass valve,
- in the inner shell 2 a dwell area 5 for supercritical hydrothermal gasification of the compressed aqueous multicomponent mixture after heating to 600 to 700 degrees Celsius comprising the synthesis gas line 11,
- wherein separation area 3, heating area 4 and dwell area 5 are interconnected and arranged as an upright column,
- wherein the synthesis gas line 11 forms an annular gap with the inner shell 2 in part of the heating area 4 or in the entire heating area 4,
- wherein the annular gap in the heating area 4 has a diameter of less than 30 mm, preferably less than 20 mm or less than 10 mm, wherein the annular gap in the upright column is located above the bypass and the heat exchanger WT4 10, wherein the synthesis gas line 11 forms an annular gap with the inner shell 2 in a part of the dwell area 5 or in the entire dwell area 5, and the annular gap in the dwell area 5 has at least partially a diameter of at least 150 mm, wherein the synthesis gas line 11 for introducing supercritical water in which synthesis gas is dissolved has at least one opening in the dwell area 5, an outer shell 6 surrounding the inner shell 2, between inner shell 2 and outer shell 6 a second pressure space 16, comprising in the second pressure space 16 an area in which one or more electric heating elements are arranged for heating the compressed aqueous multicomponent mixture to the temperature of the supercritical hydrothermal gasification and wherein this area of the pressure space 16 surrounds the annular gap in the heating area 4, wherein the synthesis gas line 11 for heating compressed aqueous multicomponent mixture and for cooling supercritical water in which synthesis gas is dissolved leads from the dwell area 5 through the heating area 4, wherein the synthesis gas line 11 is connected to the heat exchanger WT4 10 and the bypass.

In particularly preferred embodiments of the reactor 1 according to the invention, separation area 3, heating area 4 and dwell area 5 are arranged in the form of an upright column. The internals of the reactor 1, in particular separation area 3, heating area 4, dwell area 5, synthesis gas line 11, separators (A1, A2, A3) and heat exchangers (WT1, WT2, WT3, WT4, possibly WT5) have a defined arrangement in the column—as described by way of example for individual internals of the reactor 1 and shown in FIGS. 1 to 4. In preferred embodiments of the reactor 1, the separation area 3 is arranged in the lower part of the upright column, adjacent to the separation area 3 is the heating area 4, adjacent to the heating area 4 is the dwell area 5 in the upper part of the column in the pressure-tight sealable inner shell 2. In preferred embodiments of the reactor 1, heat exchanger WT3 13 and separator A3 are arranged at the bottom of separation area 3 of the upright column, heat exchanger WT2 12 and separator A2 are arranged above or adjacent to heat exchanger WT3 13 and separator A3. Heat exchanger WT1 9 and separator A1 are arranged above heat exchanger WT2 12 and separator A2 or above heat exchanger WT2 12 and separator A2 and heat exchanger WT3 13 and separator A3. In preferred embodiments of the reactor 1, heat exchanger WT4 10 and bypass are arranged in the lower part of the heating area 4, the lower part of the heating area 4 being adjacent to the separator area 3, tubular heat exchanger WT5 or synthesis gas line 11 and annular gap are arranged in the upper part and optionally in the middle part of the heating area 4, the upper part of the heating area 4 being adjacent to the dwell area 5. In preferred embodiments of the reactor 1, heat exchanger WT3 13, separator A3, heat exchanger WT2 12, separator A2 are arranged side by side in the upright column in the lower level of the separation area 3. Heat exchanger WT1 9 and separator A1 are arranged above heat exchanger WT2 12, separator A2, heat exchanger WT3 13 and separator A3. Heat exchanger WT1 9 is connected to heat exchanger WT2 12, heat exchanger WT2 12 is connected to heat exchanger WT3 13, so that the compressed aqueous multicomponent mixture.

The defined arrangement of the internals, e.g. the inner shell 2, the outer shell 6, the heat exchangers, separators, synthesis gas line 11, heating elements in the column enables recyclable materials, e.g. inorganic compounds, solids, sand, metals, metal salts, nutrients such as phosphate and ammonium, to be separated from the compressed aqueous multicomponent mixture by various thermal processes. For this purpose, physical properties and equilibrium states between different phases in which the compressed aqueous multicomponent mixture or components of the compressed aqueous multicomponent mixture are located in different areas of the column are used. For example, in the reactor 1 according to the invention, two phases are brought directly into contact with each other in countercurrent flow at different locations in the column, or a liquid phase is moved over a solid phase. For example, when the reactor 1 is used as intended, different temperatures and flow rates prevail in different areas of the column. When the reactor 1 is used as intended, the type of flow differs in different areas of the column, for example, a turbulent flow is desired in the separation area 3 for good mixing and rapid heating. The shape of the reactor 1 according to the invention as a column and the defined arrangement of the internals serve to increase mass and energy exchange and to avoid back-mixing of the separated recyclable materials and/or the supercritical water, in which synthesis gas is dissolved, with compressed aqueous multicomponent mixture. A preferred embodiment of the reactor 1 according to the invention with separation area 3, heating area 4 and dwell area 5 as an upright column is shown in FIGS. 1 to 4.

In a preferred embodiment of the reactor 1, the pressure-tight sealable inner shell 2 has the form of an upright column. When arranged as an upright column, the dwell area 5 is preferably arranged in the upper part of the upright column, i.e. in the upper part of the pressure-tight sealable inner shell 2, with the heating area 4 in the middle part of the column and the separation area 3 in the lower part of the column. In a preferred embodiment, heat exchanger WT3 13, separator A3 and heat exchanger WT2 12, separator A2 are arranged side by side in the lower part of the column, i.e. on the same level in the column, above them in the direction towards the middle part of the column are arranged heat exchanger WT1 9, separator A1. In another preferred embodiment, heat exchangers WT3 13, separator A3 are arranged in the lower part of the column, heat exchangers WT2 12, separator A2 are arranged above them in the direction towards the middle part of the column, above them in the direction towards the middle part of the column are arranged heat exchangers WT1 9, separator A1.

In alternative embodiments of the reactor 1, heat exchanger WT1 9 and separator A1 are arranged either one above the other or side by side in the inner shell 2. In particularly preferred embodiments of the reactor 1, separator A1 is integrated into heat exchanger WT1 9 (heat exchanger with integrated separator WTA1 9'). In alternative embodiments of the reactor 1, heat exchanger WT2 12 and separator A2 are arranged either one above the other or side by side. In particularly preferred embodiments of the reactor 1, separator A2 is integrated into heat exchanger WT2 12 (heat exchanger with integrated separator WTA2 12'). In alternative embodiments of the reactor 1, heat exchanger WT3 13 and separator A3 are arranged either one above the other or side by side. In particularly preferred embodiments of the reactor 1, separator A3 is integrated into heat exchanger WT3 13 (heat exchanger with integrated separator WTA3 13'). A preferred embodiment of the reactor 1 comprises as internals heat exchanger with integrated separator WTA1 9', if present heat exchanger with integrated separator WTA2 12', if present heat exchanger with integrated separator WTA3 13'.

The known heat exchangers WT1 9, WT2 12, WT3 13, WT4 10 can be used as heat exchangers, e.g. plate heat exchangers, tube bundle heat exchangers. The dimensions and shape of the separation area 3 and the heating area 4 may have to be adapted. A reactor 1 according to the invention with tubular heat exchangers WT1 9, WT2 12, WT3 13, WT4 10 for heating compressed aqueous multicomponent mixture up to 600 or up to 700 degrees Celsius, for example, requires a length of 30 to 40 meters in the separation area 3 and heating area 4. In a reactor 1 according to the invention with plate heat exchangers WT1 9, WT2 12, WT3 13, WT4 10 for heating compressed aqueous multicomponent mixture to up to 600 or up to 700 degrees Celsius, for example, there is a risk of blocking at high flow rates.

In a particularly preferred embodiment of the reactor 1, pillow-plate heat exchangers are used as heating elements. In a reactor 1 according to the invention with Pillow-Plate heat exchangers WT1 9, WT2 12, WT3 13, WT4 10, the heat exchangers can be arranged compactly. A reactor 1 according to the invention with pillow-plate heat exchangers WT1 9, WT2 12, WT3 13, optionally heat exchanger WT4 10 for heating compressed aqueous multicomponent mixture up to 600 or up to 700 degrees Celsius, for example, requires only a length of 5 to 9 m in the separation area 3 and heating area 4. Pillow-plate heat exchangers have a characteristic pillow structure. Pillow-plate heat exchangers are particularly suitable for heating compressed aqueous multicomponent mixtures such as biomass, wastewater and sewage sludge. Due to the curved walls of the Pillow-Plate heat exchangers, a lot of turbulence is formed even at low flow velocities of the compressed aqueous multicomponent mixture, so that the compressed aqueous multicomponent mixture is heated evenly and quickly when flowing through a Pillow-Plate heat exchanger. Pillow-plate heat exchangers also have high mechanical stability, so that the risk of mechanical damage or deformation and an associated shutdown or necessary repair of reactor 1 are reduced.

In a particularly preferred embodiment of the reactor 1, heat exchanger WT1 9 is a pillow-plate heat exchanger. In a particularly preferred embodiment of the reactor 1, heat exchanger WT1 9 is a pillow-plate heat exchanger and heat exchanger WT4 10 is a pillow-plate heat exchanger. In a particularly preferred embodiment of the reactor 1 according to the invention, heat exchanger WT1 9 is a Pillow-Plate heat exchanger and heat exchanger WT2 12 is a Pillow-Plate heat exchanger. In a particularly preferred embodiment of the reactor 1 according to the invention, heat exchanger WT1 9 is a Pillow-Plate heat exchanger, heat exchanger WT2 12 is a Pillow-Plate heat exchanger, heat exchanger WT4 10 is a Pillow-Plate heat exchanger. In a particularly preferred embodiment of the reactor 1 according to the invention, heat exchanger WT1 9 is a pillow-plate heat exchanger, heat exchanger WT2 12 is a pillow-plate heat exchanger, heat exchanger WT3 13 is a pillow-plate heat exchanger, heat exchanger WT4 10 is a pillow-plate heat exchanger. In particularly preferred embodiments, the reactor 1 comprises Pillow-Plate heat exchangers with integrated separator WTA1 9', WTA2 12', WTA3 13'.

In particularly preferred embodiments of the reactor 1, the separators A1, A2 and A3 are arranged one above the other and the heat exchangers are rotated 90 degrees relative to each other. In preferred embodiments, the reactor 1 comprises heat exchangers with integrated separator WTA1 9', WTA2 12' and WTA3 13', wherein the heat exchanger with integrated separator WTA1 9' is arranged above the heat exchangers with integrated separator WTA2 12' and WTA3 13' and the heat exchangers with integrated separator are rotated 90 degrees with respect to each other. In preferred embodiments, the heat exchangers are pillow-plate heat exchangers and the separators are integrated into the pillow-plate heat exchangers, with the separators arranged one above the other and the pillow-plate heat exchangers with integrated separators rotated 90 degrees with respect to each other. As a result, the reactor 1 can be built compactly and the recyclable material or valuable material fraction WF1, if applicable valuable material fraction WF2 and valuable material fraction WF3 can be separated and removed from the reactor 1.

In further embodiments, the reactor 1 according to the invention comprises an inner shell 2 that can be sealed in a pressure-tight manner,

- in the inner shell 2, a separating area 3 comprising heat exchanger with integrated separator WTA3 13' for heating compressed aqueous multicomponent mixture to up to 300 degrees Celsius and for separating a valuable material fraction WF1, heat exchanger with integrated separator WTA2 12' for heating compressed aqueous multicomponent mixture to up to 400 degrees Celsius and for separating a valuable material fraction WF2, heat exchanger with integrated separator WTA1 9' for heating compressed aqueous multicomponent mixture to up to 550 degrees Celsius and for separating a valuable material fraction WF1,
- in the inner shell 2 a heating area 4 for heating the compressed aqueous multicomponent mixture after separation of recyclable materials to 600 to 700 degrees comprising a synthesis gas line 11, a heat exchanger WT4 10, a bypass and a bypass valve,
- in the inner shell 2 a dwell area 5 for supercritical hydrothermal gasification of the compressed aqueous multicomponent mixture after heating to 600 to 700 degrees Celsius comprising the synthesis gas line 11,
- wherein separation area 3, heating area 4 and dwell area 5 are interconnected and arranged as an upright column,
- wherein the synthesis gas line 11 forms an annular gap with the inner sheath 2 in a part of the heating area 4 or in the entire heating area 4, and the annular gap in the heating area 4 has at least in part a diameter of less than 30 mm, preferably less than 20 mm or 10 mm or less,
- wherein the synthesis gas line 11 forms an annular gap with the inner shell 2 in a part of the dwell area 5 or in the entire dwell area 5, and the annular gap in the dwell area 5 has at least partially a diameter of at least 150 mm,
- and wherein the synthesis gas line 11 for introducing supercritical water in which synthesis gas is dissolved has at least one opening in the dwell area 5,
- an outer shell 6 surrounding the inner shell 2, between the inner shell 2 and the outer shell 6 a second pressure space 16 comprising in the second pressure space 16 an area in which one or more electric heating elements are arranged for heating the compressed aqueous multi-component mixture to the temperature of the super-critical hydrothermal gasification and wherein this area of the pressure space 16 surrounds the annular gap in the heating area 4, and the synthesis gas line 11 for heating compressed aqueous multicomponent mixture and for cooling supercritical water, in which synthesis gas is dissolved, leads from the dwell area 5 through the heating area 4, wherein the synthesis gas line 11 is connected to the heat exchanger WT4 10 and the bypass.

In further embodiments, the reactor 1 according to the invention comprises an inner shell 2 that can be sealed in a pressure-tight manner, in the inner shell 2, a separation area 3 comprising a pillow-plate heat exchanger with integrated separator WTA3 13' for heating compressed aqueous multicomponent mixture to up to 300 degrees Celsius and for separating a valuable material fraction WF1, Pillow-plate heat exchanger with integrated separator WTA2 12' for heating compressed aqueous multicomponent mixture to up to 400 degrees Celsius and for separating a valuable material fraction WF2, pillow-plate heat exchanger with integrated separator WTA1 9' for heating compressed aqueous multicomponent mixture to up to 550 degrees Celsius and for separating a valuable material fraction WF1, in the inner shell 2 a heating area 4 for heating the compressed aqueous multicomponent mixture after separation of valuable material fraction WF3, valuable material fraction WF2, valuable material fraction WF1 to 600 to 700 degrees Celsius comprising a pillow-plate heat exchanger WT4 10, a bypass valve, a bypass, a synthesis gas line 11, in the inner shell 2 a dwell area 5 for supercritical hydrothermal gasification of the compressed aqueous multicomponent mixture after heating to 600 to 700 degrees Celsius comprising a synthesis gas line 11, wherein separation area 3, heating area 4 and dwell area 5 are connected to each other and arranged as a column, an outer shell 6 surrounding the inner shell 2, between the inner shell 2 and the outer shell 6 a second pressure space 16, comprising in the second pressure space 16 an area in which one or more electric heating elements are arranged for heating the compressed aqueous multicomponent mixture to the temperature of the supercritical hydrothermal gasification and wherein this area of the pressure space 16 surrounds the annular gap in the heating area 4, wherein the synthesis gas line 11 forms an annular gap with the inner shell 2 in a part of the heating area 4 or in the entire heating area 4, and the annular gap at least partially has a diameter of less than 30 mm, for example less than 20 mm or less than 10 mm, wherein the synthesis gas line 11 forms an annular gap with the inner shell 2 in a part of the dwell area 5 or in the entire dwell area 5, and the annular gap in the dwell area 5 has at least partially a diameter of at least 150 mm, wherein the synthesis gas line 11 for introducing supercritical water in which synthesis gas is dissolved has at least one opening in the dwell area 5, and the synthesis gas line 11 for heating compressed aqueous multicomponent mixture and for cooling supercritical water in which synthesis gas is dissolved leads from the dwell area 5 through the heating area 4, the synthesis gas line 11 being connected to the pillow-plate heat exchanger WT4 10 and the bypass, the pillow-plate heat exchanger WT4 10 and the bypass are connected to the pillow-plate heat exchanger with integrated separator WTA1 9' in the separation area 3, the Pillow-Plate heat exchanger with integrated separator WTA1 9' is connected to the Pillow-Plate heat exchanger with integrated separator WTA2 12', the Pillow-Plate heat exchanger with integrated separator WTA2 12' is connected to the Pillow-Plate heat exchanger with integrated separator WTA3 13', wherein the separator of the Pillow-Plate heat exchanger with integrated separator WTA1 9', the separator of the pillow-plate heat exchanger with integrated separator WTA2 12' and the separator of the pillow-plate heat exchanger with integrated separator WTA3 13' are arranged one above the other and the pillow-plate heat exchanger with integrated separator WTA2 12' is rotated by 90 degrees with respect to the pillow-plate heat exchanger with integrated separator WTA3 13' and the pillow-plate heat exchanger with integrated separator WTA1 9' is rotated by 90 degrees with respect to the pillow-plate heat exchanger with integrated separator WTA2 12'.

and wherein the internals synthesis gas line 11, pillow-plate separator WT4 10, pillow-plate heat exchanger with integrated separator WTA1 9', pillow-plate heat exchanger with integrated separator WTA2 12', pillow-plate heat exchanger with integrated separator WTA3 13' are connected to one another in this order, so that, when used as intended, the supercritical water in which synthesis gas is dissolved flows through these internals one after another and thereby transferring heat to compressed aqueous multicomponent mixture which in counterflow to the supercritical water in which synthesis gas is dissolved also flows through these internals and is thereby is heated up to 600 to 700 degrees Celsius, whereby the supercritical water in which synthesis gas is dissolved being separated from the compressed aqueous multicomponent mixture by the walls of the internals, so that there is no intermixing of compressed aqueous multicomponent mixture and supercritical water in which synthesis gas is dissolved.

In particularly preferred embodiments, the pressure-tight sealable inner shell 2 of the reactor 1 comprises nickel-based alloy or nickel-based superalloys or other suitable high-temperature and/or corrosion-resistant materials. In alternative preferred embodiments, the pressure-tight sealable inner shell 2 of the reactor 1 comprises nickel-based alloy or at least one nickel-based superalloy or other suitable high temperature and/or corrosion resistant materials. In particularly preferred embodiments, the material of the internals arranged in the inner shell 2, e.g. the heat exchangers WT1 9, WT2 12, WT3 13, WT4 10 and/or the separators, e.g. separators A1, A2, A3 and/or the heat exchangers with integrated separator, e.g. heat exchanger with integrated separator WTA1 9', heat exchanger with integrated separator WTA2 12', heat exchanger with integrated separator WTA3 13' and/or pillow-plate heat exchanger e.g. pillow-plate heat exchanger with integrated separator made of nickel-based alloy. In alternative preferred embodiments, the material of the internals disposed in the inner shell 2 comprises nickel-based alloy or nickel-based superalloys or other suitable high temperature and/or corrosion resistant materials, e.g., heat exchangers WT1 9, WT2 12, WT3 13, WT4 9 in reactor 1 comprise nickel-based alloy or nickel-based superalloys or other suitable high temperature and/or corrosion resistant materials. In alternative preferred embodiments, the material of the separators, e.g., separators A1, A2, A3 and/or the material of the heat exchangers with integrated separator, e.g., heat exchanger with integrated separator WTA1 9', heat exchanger with integrated separator WTA2 12', heat exchanger with integrated separator WTA3 13' comprises nickel-based alloy or nickel-based superalloys or other suitable high-temperature and/or corrosion-resistant materials. In alternative preferred embodiments, the material of the pillow-plate heat exchanger e.g., the pillow-plate heat exchanger with integrated separator comprises nickel-based alloy or nickel-based superalloys or other suitable high temperature and/or corrosion resistant materials. In particularly preferred embodiments, the reactor 1 comprises pillow-plate heat exchangers and pillow-plate heat exchangers with integrated separator, e.g., pillow-plate heat exchangers WT1, WT2, WT3 with integrated separator A1, A2, A3 and heat exchangers WT4 as heating elements, all heat exchangers and separators being made of nickel-based alloy. In particularly preferred embodiments, the reactor 1 comprises pillow-plate heat exchangers WT1, WT2, WT3 with integrated separator A1, A2, A3 and heat exchanger WT4 as heating elements, wherein all heat exchangers and separators comprise nickel-based alloy.

Nickel-base alloys are materials whose main component is nickel and which are produced with at least one other chemical element, usually by means of a melting process. Nickel-based alloys have good corrosion and/or high-temperature resistance (creep resistance). Nickel-based alloys include nickel-copper, nickel-iron, nickel-iron-chromium, nickel-chromium, nickel-molybdenum-chromium, nickel-chromium-cobalt, and other multi-material alloys. Most nickel-based alloys are classified according to international standards and are known to those skilled in the art. In certain embodiments of the reactor 1, the inner shell 2, which can be sealed in a pressure-tight manner, and the internals in the inner shell 2, e.g., heat exchanger, separator, and synthesis gas line 11, are made of nickel-based alloy. In certain embodiments of the reactor 1, the pressure-tightly closable inner shell 2 and the internals in the inner shell, e.g., heat exchanger, separator and synthesis gas line 11, comprise nickel-based alloy, wherein the pressure-tightly closable inner shell 2 and the internals in the inner shell 2 may fully or partially comprise further layers of other materials or materials.

In the reactor 1 according to the invention, the internals arranged in the inner shell 2 of the reactor 1, for example heat exchangers WT1 9, WT2 12, WT3 13, WT4 10, separators A1, A2, A3, in particular heat exchangers with integrated separator, particularly preferably pillow-plate heat exchangers and pillow-plate heat exchangers with integrated separator, synthesis gas line 11 a wall thickness of less than 50 mm, for example 30 mm, for example 20 mm or 15 mm, preferably 10 mm or less, for example 5 mm. In particularly preferred embodiments of the reactor 1, the internals comprise thin, preferably thin, nickel-based alloy sheet. For example, in some embodiments of the reactor 1, the sheet metal of the internals has a wall thickness of 10 mm or less, 5 mm or less, preferably 1 to 3 mm, less than 2 mm, particularly preferably about 1 mm, for example 1.5 to 0.75 mm. The thin wall thicknesses of the internals, particularly in the heat exchangers and the synthesis gas line 11, result in very good heat transfer between compressed aqueous multicomponent mixture and supercritical water, in which synthesis gas is dissolved, in the separating 3 and heating area 4.

In the reactor 1 according to the invention, the pressure-tight sealable inner shell 2 of the reactor 1 has a wall thickness of less than 50 mm, for example 30 mm or 20 mm or less, preferably 10 mm or less, for example 9 mm, 8 mm, 7 mm, 6 mm, 5 mm, 4 mm, 3 mm or less. In particularly preferred embodiments, the pressure-tight sealable inner shell 2 of the reactor 1 is made of thin sheet metal of nickel-based alloy, for example the sheet metal of the inner shell 2 has a wall thickness of 10 mm or less, 5 mm or less, preferably 1 to 3 mm, less than 2 mm, particularly preferably about 1 mm, for example 1.5 to 0.75 mm. Due to the extremely thin wall thickness of the inner shell 2, less nickel-based alloy is required for the manufacture and very good heat transfer occurs between the one or more heating elements arranged to heat the compressed aqueous multicomponent mixture to the temperature of the supercritical hydrothermal gasification in the second pressure space 16 in the area surrounding the annular gap in the heating area 4 through which the compressed aqueous multicomponent mixture flows. A disadvantage of the nickel-base alloy material is that nickel-base alloys have little pressure resistance in the temperature range above 550 degrees Celsius, in particular at 600 to 700 degrees Celsius. The pressure difference between the pressure of the compressed aqueous multicomponent mixture prevailing inside the inner shell 2 and normal pressure outside the inner shell 2 would not be withstood by the inner shell 2 if the inner shell 2 were thin-walled.

In order to have no or only a very small pressure difference between the interior of the pressure-tight sealable inner shell 2 (first pressure space 15) and outside the inner shell 2, the reactor 1 in preferred embodiments comprises a pressure-tight sealable outer shell 6, which surrounds the pressure-tight sealable inner shell 2 and encloses a second pressure space 16 between the inner shell 2 and the outer shell 6. The pressure in the second pressure space 16 can be compressed, for example by a gas or a liquid, during intended operation of the reactor 1 and adapted to the pressure inside the inner shell 2. In preferred embodiments, the reactor 1 comprises a second pressure space 16 between the inner shell 2 and the outer shell 6, wherein the second pressure space 16 comprises a gas, preferably an inert gas (inert gas) or a mixture of inert gases, that is compressible to the pressure of 25 to 35 MPa prevailing in the first pressure space 15. In alternative embodiments, the reactor 1 comprises in the second pressure space 16 a liquid compressible to the pressure in the first pressure space 15.

Inert gas is a gas which is very inert under the reaction conditions in question, or which does not participate or only participates in a few chemical reactions. In the present context, inert gases are gases that are very inert at pressures above 20 MPa, preferably at pressures of 25 to 35 MPa and temperatures of 200 to 700 degrees Celsius, and do not participate or participate only very little in chemical reactions. For example, elemental gases such as nitrogen, noble gases such as helium, neon, argon, krypton, xenon, and gaseous molecular compounds such as sulfur hexafluoride and carbon dioxide can be used as inert gases in the second pressure space 16. Also, mixtures of the above gases can be used. Suitable inert gases and gas mixtures are known to the skilled person.

In preferred embodiments of the reactor 1, the second pressure space 16 comprises nitrogen as an inert gas. In other preferred embodiments, the second pressure space 16 comprises a mixture of nitrogen with hydrogen, preferably a mixture with ≤5 vol % hydrogen. Mixtures of nitrogen with ≤5 vol % hydrogen are non-flammable. A mixture of nitrogen with ≤5 vol % hydrogen may comprise other gaseous components, the proportion of nitrogen being at least 50 vol %. A mixture of nitrogen with ≤5 vol % hydrogen as a gas in the second pressure space 16 prevents scaling. Scaling is understood to be the formation of thick-layered oxidation products on the surface of metallic materials occurring at elevated temperatures as a result of metal-oxygen reactions.

In preferred embodiments of the reactor 1 according to the invention, the pressure of the gas in the second pressure space 16 is matched to the pressure inside the inner shell 2.

In particularly preferred embodiments of the reactor 1, the metal sheet of the inner shell 2 comprises nickel-based alloy and has a wall thickness of less than 10 mm, preferably less than 5 mm, particularly preferably less than 2 mm thickness, and the pressure difference between the first pressure space 15 (pressure inside the inner shell 2) and the second pressure space 16 (pressure in the space between the inner shell 2 and the outer shell 6) is maximum+1-5 bar, i.e. the pressure in the second pressure space 16 is maximum 5 bar higher or maximum 5 bar lower than in the first pressure space 15. Preferably, the pressure in the first pressure space 15 is higher than the pressure in the second pressure space 16, i.e., preferably the pressure in the first pressure space 15 is maximum 5 bar higher than in the second pressure space 16. For example, the pressure inside the pressure-tight sealable inner shell 2 is 27.3 MPa and the pressure in the second pressure space 16 is 27 MPa. This avoids a pressure difference of more than 5 bar between the first pressure space 15 inside the inner shell 2 and the second pressure space 16. The inner shell 2 made of nickel-based alloy with a wall thickness of less than 10 mm, preferably less than 5 mm, particularly preferably less than 2 mm thickness, is thus exposed to no or only a small pressure difference.

In the particularly preferred embodiments of the reactor 1, the metal sheet of the inner shell 2 comprises nickel-based alloy and has a wall thickness of less than 10 mm, preferably less than 5 mm, particularly preferably less than 2 mm in thickness, and the pressure difference between the first pressure space 15 (pressure inside the inner shell 2) and the third pressure space 17 (pressure inside the heat exchangers and inside the synthesis gas line 11) is maximum+1-2 bar, preferably +1-1 bar or less, particularly preferably +1-0.5 bar, +1-3 bar, +1-0.1 bar or less. The internals arranged inside the inner shell 2 such as heat exchanger, separator, bypass, synthesis gas line are also made of nickel-based alloy with a wall thickness of less than 10 mm, preferably less than 5 mm, particularly preferably less than 2 mm thickness are thereby exposed to no or only a very small pressure difference.

In further embodiments, the reactor 1 according to the invention comprises an inner shell 2 that can be sealed in a pressure-tight manner, in the inner shell 2, a separation area 3 comprising heat exchanger WT1 9 and separator A1 for heating compressed aqueous multicomponent mixture to up to 550 degrees Celsius and for separating a valuable material fraction WF1 from the compressed aqueous multicomponent mixture, in the inner shell 2 a heating area 4 for heating the compressed aqueous multicomponent mixture after separation of the valuable material fraction WF1 to 600 to 700 degrees comprising a synthesis gas line 11, a bypass, a heat exchanger WT4, in the inner shell 2 a dwell area 5 for supercritical hydrothermal gasification of the compressed aqueous multicomponent mixture after heating to 600 to 700 degrees Celsius comprising the synthesis gas line 11, wherein separation area 3, heating area 4 and dwell area 5 are interconnected and arranged as an upright column, wherein the inner shell 2, heat exchanger WT1 9, heat exchanger WT4 10, separator A1 and synthesis gas line 11 comprise nickel-based alloy or are made of nickel-based alloy and have a wall thickness of 500 mm or less, preferably 200 mm or less.

In further embodiments, the reactor 1 according to the invention comprises an inner shell 2 that can be sealed in a pressure-tight manner, in the inner shell 2, a separation area 3 comprising heat exchanger WT1 9 and separator A1 for heating compressed aqueous multicomponent mixture to up to 550 degrees Celsius and for separating a valuable material fraction WF1 from the compressed aqueous multicomponent mixture, in the inner shell 2 a heating area 4 for heating the compressed aqueous multicomponent mixture after separation of recyclable materials to 600 to 700 degrees comprising a synthesis gas line 11, a bypass, a heat exchanger WT4, in the inner shell 2 a dwell area 5 for supercritical hydrothermal gasification of the compressed aqueous multicomponent mixture after heating to 600 to 700 degrees Celsius comprising the synthesis gas line 11, a pressure-tight lockable outer shell 6 surrounding the inner shell 2, between the inner shell and the outer shell a second pressure space 16, wherein separation area 3, heating area 4 and dwell area 5 are interconnected and arranged as an upright column, wherein the inner shell 2, heat exchanger WT1 9, heat exchanger WT4 10, separator A1 and synthesis gas line 11 comprise nickel-based alloy or are made of nickel-based alloy and have a wall thickness of 10 mm or less, preferably 5 mm or less, the second pressure space 16 comprises a compressible inert gas or liquid.

In further embodiments, the reactor 1 according to the invention comprises a pressure-tight sealable inner shell 2 enclosing a first pressure space 15, in the inner shell 2, a separation area 3 comprising a pillow-plate heat exchanger with integrated separator WTA3 13' for heating compressed aqueous multicomponent mixture to up to 300 degrees Celsius and for separating a valuable material fraction WF1, Pillow-plate heat exchanger with integrated separator WTA2 12' for heating compressed aqueous multicomponent mixture to up to 400 degrees Celsius and for separating a valuable material fraction WF2, pillow-plate heat exchanger with integrated separator WTA1 9' for heating compressed aqueous multicomponent mixture to up to 550 degrees Celsius and for separating a valuable material fraction WF1, in the inner shell 2 a heating area 4 for heating the compressed aqueous multicomponent mixture after separation of valuable material fraction WF3, valuable material fraction WF2, valuable material fraction WF1 to 600 to 700 degrees Celsius comprising a pillow-plate heat exchanger WT4 10, a bypass valve, a bypass, a synthesis gas line 11, in the inner shell 2 a dwell area 5 for supercritical hydrothermal gasification of the compressed aqueous multicomponent mixture after heating to 600 to 700 degrees Celsius comprising the synthesis gas line 11, wherein separation area 3, heating area 4 and dwell area 5 are interconnected and arranged as an upright column, wherein the synthesis gas line 11 forms an annular gap with the inner shell 2 in part of the heating area 4 or in the entire heating area 4, and the annular gap has at least in part a diameter of at most 30 mm or less, preferably 20 mm or 15 mm or less, for example 4 to 10 mm, wherein the synthesis gas line 11 forms an annular gap with the inner shell 2 in a part of the dwell area 5 or in the entire dwell area 5, and the annular gap in the dwell area 5 has at least partially a diameter of at least 150 mm, wherein the synthesis gas line 11 for introducing supercritical water in which synthesis gas is dissolved has at least one opening in the dwell area 5, comprising an outer shell 6 surrounding the inner shell 2, between inner shell 2 and outer shell 6 a second pressure space 16, comprising in the second pressure space 16 an area in which one or more electric heating elements are arranged for heating the compressed aqueous multicomponent mixture to the temperature of the supercritical hydrothermal gasification and wherein this area of the pressure space 16 surrounds the annular gap in the heating area 4 and the second pressure space 16 comprises a compressible inert gas or a compressible liquid, and wherein the pressure difference between the first pressure space 15 and the second pressure space 16 is maximum+/−5 bar.

Various technical options are known to the skilled person for setting the pressure of the inert gas or compressible liquid in the second pressure space 16.

By matching the pressure in the second pressure space 16 to the pressure in the first pressure space 15 (pressure inside the inner shell 2) and/or to the third pressure space 17 (pressure inside the heat exchangers and the synthesis gas line 11), the pressure load on the inner shell 2 and the pressure load on the internals are minimized or eliminated. As a result, the nickel-based alloy material is exposed to high temperatures in the dwell and heat-up area 4, but to no or only a low pressure load. As a result, high-quality materials such as nickel-base alloy, which have high temperature and corrosion resistance but only low pressure resistance, can be used with thin walls for the inner shell 2 and the internals inside the inner shell 2. Since temperature and corrosion resistant materials such as nickel base alloys are very expensive, these embodiments of the reactor 1 reduce the material cost of manufacturing the reactor 1. Due to the pressure relief of the inner shell 2 and internals located within the inner shell 2, the nickel base alloy walls can be made thin. Therefore, significantly less material is required. The investment for a reactor 1 is reduced to about one-eighth of what would be required in material costs without pressure relief. Since the reactor 1 according to the invention is significantly lighter due to the thinner wall of the inner shell 2 in this embodiment, transport and maintenance costs are also reduced in addition to the manufacturing costs.

In preferred embodiments of the reactor 1 according to the invention, the pressure-tight sealable inner shell 2 has a distance of at least 100 mm, preferably at least 150 mm, particularly preferably at least 200 mm or more, from the pressure-tight sealable outer shell 6. In other embodiments of the reactor 1, the distance of the pressure-tight sealable inner shell 2 from the pressure-tight sealable outer shell 6 is not the same everywhere. In preferred embodiments of the reactor 1 according to the invention, at least in the area in which the dwell area 5 and optionally at least partially the heating area 4 are arranged in the inner shell 2, the pressure-tightly sealable inner shell 2 is at a distance of at least 100 mm, preferably at least 150 mm, particularly preferably at least 200 mm or more, from the pressure-tightly sealable outer shell 6.

In preferred embodiments of the reactor 1 according to the invention, the second pressure space 16 comprises at least one layer of a thermally insulating material, preferably one or more high temperature insulating layers. In preferred embodiments of the reactor 1 according to the invention, the second pressure space 16 comprises two layers of heat insulating material, preferably two high temperature insulating layers. For example, the first layer of thermally insulating material and the second layer of thermally insulating material may have different thermal conductivities. Preferably, the first layer of heat insulating material and the second layer of heat insulating material have different heat transfer coefficients. Preferably, the first layer of thermally insulating material and the second layer of thermally insulating material have different thermal conductivities and different heat transfer coefficients. Preferably, the first heat insulating layer and the second heat insulating layer are bonded. The heat insulating layers comprise or consist of heat insulating material, preferably high temperature insulating layers. In the reactor 1 according to the invention, the heat insulating materials for the heat insulating layers can be independently selected from high temperature wool, mineral wool, ceramic fleece, mineral insulation. Other suitable heat insulating materials are known to the skilled person.

The one or more thermal insulating layers may completely or partially surround the inner shell 2. In one embodiment of the reactor 1, the thermal insulating layer(s) completely surrounds the inner shell 2 except for the portion of the inner shell 2 that faces the bottom. In one embodiment, the thermal insulating layer(s) completely surrounds the inner shell 2 except for the base plate 7. In further preferred embodiments of the reactor 1, at least the area where the dwell area 5 is located inside the inner shell 2 is surrounded by one or more thermal insulating layers. In further preferred embodiments of the reactor 1, at least the area in which, inside the inner shell 2, the dwell area 5 and the heating area 4 are arranged is surrounded by one or more heat-insulating layers.

In preferred embodiments of the reactor 1 according to the invention, the inner shell 2 has a distance of at least 100 mm from the outer shell 6, preferably at least 150 mm, particularly preferably at least 200 mm or more, and comprises in this area one or two layers of a heat-insulating material. In other preferred embodiments of the reactor 1 according to the invention, at least in the area in which the heating area 4 is arranged in the inner shell 2, the inner shell 2 has a distance from the outer shell 6 of at least 100 mm, preferably at least 150 mm, particularly preferably at least 200 mm or more, and comprises in this area one or two layers of a heat-insulating material. In the reactor 1 according to the invention, the thickness of the first layer of thermally insulating material may be at least 25 mm, preferably at least 40 mm, more preferably at least 50 mm or more. In the reactor 1 according to the invention, the thickness of the second layer of heat-insulating material may be at least 80 mm, preferably at least 100 mm, more preferably at least 150 mm or more.

In preferred embodiments of the reactor 1 according to the invention, the inner shell 2 has a distance of 200 mm from the outer shell 6 and comprises in this area a layer of a thermally insulating material with a thickness of 50 mm and a second layer of a thermally insulating material with a thickness of 150 mm. In preferred embodiments of the reactor 1 according to the invention, the inner shell 2 has a distance of 100 mm from the outer shell 6 and comprises in this area a layer of a thermally insulating material with a thickness of 50 mm and a second layer of a thermally insulating material with a thickness of 50 mm.

In other preferred embodiments of the reactor 1 according to the invention, at least in the area in which the dwell area 5 and, if appropriate, at least partially the heating area 4 are arranged in the inner shell 2, the inner shell 2 is at a distance of at least 200 mm from the outer shell 6 and comprises in this area a layer of a thermally insulating material having a thickness of 50 mm and a second layer of a thermally insulating material having a thickness of 150 mm. In other preferred embodiments of the reactor 1 according to the invention, at least in the area in which the dwell area 5 and optionally at least partially the heating area 4 are arranged in the inner shell 2, the inner shell 2 has a distance of at least 100 mm from the outer shell 6 and comprises in this area a layer of a thermally insulating material having a thickness of 50 mm or more and a second layer of a thermally insulating material having a thickness of 50 mm or more.

In particularly preferred embodiments of the reactor 1, the second pressure space 16 comprises an inert gas and two layers of heat-insulating material. Although during supercritical hydrothermal gasification the temperature in the dwell area 5 in the inner shell 2 is 600 to 700 degrees Celsius, the temperature at pressure-tightly sealable outer shell 6 is only 350 degrees Celsius or less, preferably 300 degrees Celsius or 280 degrees Celsius or less, preferably 200 degrees Celsius or less. Depending on the embodiment of the reactor 1, i.e. inert gas used or compressible liquid used, if available, thickness and material of the first heat insulating layer and, if available, thickness and material of the second heat insulating layer, the temperature on the inside of the pressure-tight sealable outer shell 6 is between 100 and 250 degrees Celsius, for example 220 degrees Celsius, 200 degrees Celsius, 150 degrees Celsius or less. These temperature specifications for the inside of the outer shell 6 refer to the area where the dwell area 5 is located inside the inner shell 2.

In particular embodiments, the reactor 1 according to the invention comprises a line 14 for the addition of precipitant in the separation area 3, for example for the addition of precipitants such as $Mg^{2+}$, $Ca^{2+}$ and $K^{+}$ to the compressed aqueous multicomponent mixture. The reactor 1 may comprise, for example, a line 14 for the addition of precipitant in the separation area 3, arranged such that the precipitant may be added to the compressed aqueous multicomponent mixture prior to separation of the valuable fraction WF1 at 550 degrees Celsius, preferably at 400 to 550 degrees Celsius, in order to achieve the most complete separation of phosphate and ammonium in the separation area 3. In preferred embodiments, the reactor 1 according to the invention comprises for this purpose a line 14 for the addition of precipitant, which is connected to the heat exchanger WT1 9 and/or the separator A1. In preferred embodiments, the reactor 1 according to the invention comprises, for this purpose, a line 14 for the addition of precipitant, which is connected to the heat exchanger with integrated separator WTA1 9'. In preferred embodiments, the reactor 1 according to the invention comprises a line 14 for the addition of the precipitant, which opens into the separator A1 or the integrated separator.

In particularly preferred embodiments, the inner shell 2 comprises an opening that can be closed in a pressure-tight manner with a base plate 7. In particularly preferred embodiments, the inner shell 2 and the outer shell 6 comprise an opening that can be closed in a pressure-tight manner with a base plate 7. Pressure-tightly sealable means that set pressures of about 25 to 35 MPa are maintained in the first pressure space 15 and the second pressure space 16 when the inner shell 2 and the outer shell 6 are pressure-tightly sealed. In particular embodiments, the outer shell 6 comprises an opening that can be sealed pressure-tight with a base plate 7.

In preferred embodiments, the reactor 1 comprises opening for a base plate in the inner shell 2 and a base plate 7 that is pressure-tightly connected to the pressure-tightly sealable inner shell 2. In preferred embodiments, the reactor 1 comprises an opening for a base plate in the inner shell 2 and in the outer shell 6 and a base plate 7 pressue-tightly connected to the pressure-tightly sealable inner shell 2 and the pressure-tightly lockable outer shell 6. In preferred embodiments, the heat exchanger(s), the separator(s) in the inner shell 2 are arranged on the base plate 7. The separator area 3 is adjacent to the base plate 7. In preferred embodiments, the separator area 3, the heating area 4 and the dwell area 5 are arranged on the base plate 7 in an upright column inside the inner shell 2, which is connected to the base plate 7 in a pressure-tight manner. Preferably, in this embodiment of the reactor 1, the separation area 3 is arranged above the base plate 7, with the dwell area 5 in the uppermost part of the inner shell 2 and the heating area 4 in the middle between the separation area 3 and the dwell area 4, wherein the separation area 3 being adjacent to the heating area 4 and the heating area 4 being adjacent to the dwell area 5. In preferred embodiments, the reactor 1 according to the invention comprises a base plate 7 made of steel. In preferred embodiments, the reactor 1 according to the invention comprises a base plate 7 having a thickness of 20 cm or less, for example 15 cm or 10 cm.

In preferred embodiments, the reactor 1 according to the invention comprises a pressure-tight sealable inner shell 2, which encloses a first pressure space 15 and has an opening for a base plate 7,

- in the inner shell 2, a separation area 3 comprising heat exchanger WT1 9 and separator A1 for heating compressed aqueous multicomponent mixture to up to 550 degrees Celsius and for separating a valuable material fraction WF1 from the compressed aqueous multicomponent mixture,
- in the inner shell 2 a heating area 4 with one or more heating elements for heating the compressed aqueous multicomponent mixture to 600 to 700 degrees Celsius after separation of the valuable material fraction WF1,
- in the inner shell 2 a dwell area 5 for supercritical hydrothermal gasification of the compressed aqueous multicomponent mixture after heating to 600 to 700 degrees Celsius,
- wherein separation area 3, heating area 4 and dwell area 5 are connected to each other and are arranged as an upright column on the base plate 7,
- wherein the base plate 7 is connected to the inner shell 2 in a pressure-tight sealed manner via flange connections, and wherein the separating area 3 is arranged above the base plate 7, the heating area 4 is arranged above the separating area 3, and the dwell area 5 is arranged above the heating area 4.

In preferred embodiments, the reactor 1 comprises a base plate 7 having one or more openings for the passage of lines 14, for example one or more openings for one or more reactant lines for the introduction of compressed aqueous multicomponent mixture into the inner shell 2, wherein the reactant line(s) is/are connected to the base plate 7 in a pressure-tight sealable manner. In preferred embodiments, the reactor 1 according to the invention comprises a base plate 7 having at least one opening for separating recyclable material. In preferred embodiments, the reactor 1, comprises at least one opening for a line 14 optionally with valve for separation of valuable material fraction WT1. In preferred embodiments, the reactor 1, comprises at least one opening for a line 14 optionally with valve for separating valuable material fraction WT1 and at least one opening for a line 14 optionally with valve for separating valuable material fraction WT2. In preferred embodiments, the reactor 1, comprises at least one opening for a line 14 optionally with valve for separating valuable material fraction WT1 and at least one opening for a line 14 optionally with valve for separating valuable material fraction WT2 and at least one opening for a line 14 optionally with valve for separating valuable material fraction WT3. Each, line 14 for separating recyclable material or valuable material fractions is connected to the base plate 7 in a pressure-tight lockable manner. In preferred embodiments, the reactor 1 according to the invention comprises a base plate 7 with at least one opening for the synthesis gas line 11 for separating water containing synthesis gas (=cooled, formerly supercritical water in which synthesis gas is dissolved), which is connected to the base plate 7 in a pressure-tight lockable manner. In preferred embodiments, the reactor 1 according to the invention comprises a base plate 7 having one or more openings for one or more gas lines connected to the second pressure space 16 for introducing gas or liquid and adjusting the pressure in the second pressure space 16, each gas line being connected to the base plate 7 in a pressure-tight closable manner. In preferred embodiments, the reactor 1 according to the invention comprises a base plate 7 having at least one opening for a line 14 for the addition of precipitant, wherein the line 14 for the addition of precipitant is connected to the base plate 7 in a pressure-tight closable manner and is connected to the first pressure space 15.

In preferred embodiments of the reactor 1, the base plate 7 is connected to the pressure-tight lockable inner shell 2 via flange connections. In preferred embodiments of the reactor 1, the base plate 7 is connected to the pressure-tight lockable outer shell 6 via flange connections. Suitable flange connections enable a pressure-tight connection between inner shell 2 and base plate 7 and, where present, between outer shell 2 and base plate 7. The flange connections also enable the inner shell 2 and, where present, the outer shell 6 to be removed in order to replace or repair internals such as heat exchangers or other heating elements, separators, synthesis gas line 11, bypass valve, or to clean the inner shell 2 or the internals. Suitable flange connections are known to the skilled person and are disclosed, for example, in EP1010931B1.

In preferred embodiments of the reactor 1, the outer shell 6 is made of steel, preferably high strength steel, for example stainless steel. In particular embodiments, the outer shell 6 is made of steel coated, for example the outer shell 6 comprises a glass fiber layer, for example the outer shell 6 comprises a glass fiber layer on the outside. For example, the outer shell 6 has a wall thickness of 150 mm or less, for example 90 mm or 50 mm. In preferred embodiments of the reactor 1, the outer shell 6 is made of steel and has a wall thickness of 80 mm or less.

In preferred embodiments of the reactor 1, the outer shell 6 has a diameter of 5 m or less, preferably 3 m or 1 m, more preferably 2 m to 1.5 m, 1.9 m to 1.6 m, 1.7 m or 1.8 m. In preferred embodiments, the outer shell 6 has the shape of a cylinder.

In preferred embodiments, the reactor 1 comprises a steel framework 8 that surrounds and stabilizes the outer shell 6. In preferred embodiments, the reactor 1 according to the invention is stabilized by a steel scaffolding 8. Preferably, the steel scaffolding 8 surrounds the outer shell 6. In preferred embodiments, the steel scaffolding 8 extends onto the base plate 7 and is optionally connected thereto. Preferably, the steel scaffolding 8 surrounding and stabilizing the reactor extends to the ground. For example, the steel scaffolding 8 is connected to a foundation in the ground.

In order to make the pressure in the second pressure space 16 adjustable, the outer shell 6 can be closed in a pressure-tight manner. In order to maintain the pressure in the first pressure space 15 during heating of compressed aqueous multicomponent mixture, separation of recyclable material or valuable material fractions from the compressed aqueous multicomponent mixture, further heating of the compressed aqueous multicomponent mixture and during and after supercritical hydrothermal gasification of the compressed aqueous multicomponent mixture, the inner shell 2 is pressure-tightly sealable. When the reactor 1 is used as intended, the outer shell 6 and the inner shell 2 are sealed in a pressure-tight manner. When the reactor 1 is used as intended, the pressure inside the second pressure space 16 is adjusted and the inert gas or compressible liquid inside the second pressure space 16 is compressed. The pressure inside the inner shell 2 is transferred from the inner shell 2 to the outer shell 6 of the reactor 1 via the compressed inert gas or liquid. The pressure of the compressed inert gas or liquid in the second pressure space 16 acts on the outer wall of the inner shell 2, while the pressure of the compressed aqueous multicomponent mixture acts on the inner wall of the inner shell 2. The pressure thus acts on the surface of the inner shell 2 from both directions, preventing the inner shell 2 from being damaged or deformed by a larger pressure difference, and ensuring the mechanical stability of the inner shell 2. In the case of a compressed inert gas, this achieves pneumatic compression of the inner shell 2, and in the case of a compressed liquid, hydraulic compression of the inner shell 2. During start-up (commissioning) of the reactor 1, the inner shell 2 is filled with aqueous multicomponent mixture compressed to 25 to 35 MPa, and the temperature in the heating elements in the separation area is increased up to 550 degrees Celsius, and the temperature in the heating elements in the heating area and in the heaters in the second pressure space 16 is increased up to 600 to 700 degrees Celsius. At the same time, the pressure inside the inner shell 2 increases. When the reactor 1 is started up, the pressure inside the outer shell 6 is also increased in accordance with the pressure in the inner shell 2. During specified operation, the pressure in the second pressure space 6 is adjusted to the pressure inside the inner shell 2 to avoid pressure differences greater than 5 bar.

The reactor 1 is preferably operated as a flow-through reactor 1. When the reactor 1 according to the invention is operated as intended, inert gas is introduced into the second pressure space 16 via a first gas line which is connected in a pressure-tight manner to the outer shell 6 via the base plate 7. When the reactor 1 according to the invention is operated as intended, inert gas is discharged from the second pressure space 16 via a second gas line which is connected in a pressure-tight manner to the outer shell 6 via the base plate 7. When the reactor 1 according to the invention is operated as intended, compressed aqueous multicomponent mixture is introduced into the inner shell 2 of the reactor 1 via the reactant line, which is connected in a pressure-tight manner to the inner shell 2 via the base plate 7. When the reactor 1 according to the invention is operated as intended, synthesis gas dissolved in water is discharged from the inner shell 2 of the reactor 1 via the synthesis gas line 11, which is connected to the inner shell 2 in a pressure-tight manner via the base plate 7. The pressure in the second pressure space 16 is adjusted according to known procedures with high-pressure gas tank, low-pressure gas tank and, if necessary, medium-pressure gas tank. Corresponding procedures are known to the skilled person.

It is also an object of the invention to provide methods for manufacturing a reactor 1 according to the invention.

An object of the invention is a plant for operating the reactor 1 according to the invention comprising a reactor 1 according to the invention and one or more pumps. A preferred embodiment of the plant for operating the reactor 1 according to the invention comprises a high-pressure pump for compressing aqueous multicomponent mixture to 25 to 35 MPa. For example, the high-pressure pump is located below the base plate 7 or to the side of the base plate 7.

One embodiment of the plant for operating the reactor 1 according to the invention comprises a reactor 1 according to the invention, a high-pressure pump for compressing aqueous multicomponent mixture to 25 to 35 MPa, and a shredding device. One embodiment of the plant for operating the reactor 1 according to the invention comprises a reactor according to the invention, a high-pressure pump for compressing aqueous multicomponent mixture to 25 to 35 MPa, a shredding device for comminution of multicomponent mixture used as reactant, and a device for diluting multicomponent mixture used as reactant. The equipment for operating the reactor 1 according to the invention preferably comprises a recirculating water line for diluting multicomponent mixture used as reactant with (process) water obtained, for example, by expansion from the synthesis gas-water mixture, the product of supercritical hydrothermal gasification.

A preferred embodiment of the plant for operating the reactor 1 according to the invention preferably comprises devices for measuring and regulating the gas pressure in the second pressure space 16. In one embodiment, the system for operating the reactor 1 according to the invention comprises a low-pressure gas storage for the inert gas and a high-pressure gas storage for the inert gas. The low-pressure gas storage and the high-pressure gas storage are connected to the second pressure space 16 of the reactor 1 according to the invention, for example via gas lines. The gas pressure in the second pressure space 16 can be regulated via the low pressure gas storage and the high pressure gas storage. In one embodiment, the plant according to the invention for operating the reactor 1 according to the invention comprises a low-pressure gas storage for the inert gas, a high-pressure gas storage for the inert gas and a medium-pressure gas storage for the inert gas. In one embodiment, the system according to the invention for operating the reactor 1 according to the invention preferably comprises one or more gas lines and valves for adjusting the pressure of the inert gas in the second pressure space 16, preferably at least one pressure measuring device, and optionally a temperature measuring device, which are connected to the second pressure space 16.

A preferred embodiment of the plant for operating the reactor 1 according to the invention comprises a pump for pumping the precipitant through the line 14 for the precipitant and into the separation area 3 in the inner shell 2. For example, the pump for pumping the precipitant is arranged under the base plate 7 or laterally from the base plate 7 and connected to the separation area 3 via a line 14.

A preferred embodiment of the plant for operating the reactor 1 according to the invention comprises a container connected to the reactor 1 according to the invention. A preferred embodiment of the plant for operating the reactor 1 according to the invention comprises a container comprising the electronic infrastructure for controlling the reactor 1, comprising, if appropriate, the control system and the connections for the gas supply, comprising, if appropriate, the control system and the connections for the power supply, comprising, if appropriate, the control system and the connections for a cooling system for separating water from synthesis gas-water mixture and, if appropriate, further components. In this way, turnkey plants can be manufactured, delivered and quickly put into operation.

Plants comprising a reactor 1 according to the invention are, for example, waste disposal plants, water treatment plants or power supply plants. A particular embodiment of the plant comprises a reactor 1 according to the invention,

- a container comprising the electronic infrastructure for controlling the reactor 1, preferably connections for the gas supply, preferably connections for the power supply, preferably connections for the cooling, preferably connections for the educt line, preferably connections for the product line, preferably connections for the recyclable material lines,
- wherein the electronic infrastructure is connected to the reactor via electrical lines and, if present, the aforementioned connections are connected to the reactor via the corresponding lines,
- optionally a shredding device for comminution of multicomponent mixture used as reactant, the shredding device being connected to the reactant line,
- optionally, a dilution unit for diluting multicomponent mixture used as reactant, the dilution unit being connected to the reactant line,
- optionally, a reservoir for the aqueous multicomponent mixture, the reservoir being connected to the reactant line,
- pumps, for example, a high-pressure pump for compressing the aqueous multicomponent mixture, the high-pressure pump being connected to the reactant line, optionally a pump for the precipitant, optionally a pump for the circulating water, the pump for the precipitant being connected to the line 14 for the precipitant,
- if necessary, a processing plant for cooling and separating gasification product into water and synthesis gas,
- a water treatment plant, if necessary,
- if necessary, a gas processing plant,
- optionally gas storage such as hydrogen storage, methane storage, synthesis gas storage, low pressure storage, medium pressure storage, high pressure storage, the storage being connected to the synthesis gas line 11.

The plants according to the invention can be used in a variety of ways. Reactor 1 can also be integrated into existing plants. Defective plants or individual defective modules of the plant can be easily replaced.

It is also an object of the invention to provide methods for assembling a plant comprising a reactor 1 according to the invention.

It is also an object of the invention to provide processes for supercritical hydrothermal gasification carried out in the many embodiments of reactor 1 according to the invention. It is an object of the invention to provide processes for the supercritical hydrothermal gasification of aqueous multicomponent mixtures comprising the introduction of compressed aqueous multicomponent mixture into the reactor 1 according to the invention by means of reactant line, the heating of the heat exchangers WT1 9, and if applicable heat exchanger WT2 12, and if applicable heat exchanger WT3 13 in the separation area 3 of the reactor 1 according to the invention up to 550 degrees Celsius, Separation of recyclable material from the compressed aqueous multicomponent mixture by means of separator A1, and if applicable separator A2, and if applicable separator A3, into one to three valuable material fractions WF1, and if applicable WF2 and if applicable WF3, heating of the heat exchanger WT4 10 in the heating area 4 to 600 to 750 degrees Celsius, preferably 610 to 720 degrees Celsius, preferably maximum 710 degrees Celsius, heating the heaters in the second pressure space 16 to 600 to 750 degrees Celsius, preferably 610 to 720 degrees Celsius, preferably maximum 710 degrees Celsius, regulation of the flow or the amount of supercritical water, in which synthesis gas is dissolved, flowing through the heat exchanger WT4 and the bypass by means of the bypass valve, the introduction of compressed inert gas into the second pressure space 16, if necessary, the discharge of compressed inert gas from the second pressure space 16, the removal of compressed water in which synthesis gas is dissolved from reactor 1 The above process steps can be carried out in a different order or in parallel.

The aqueous multicomponent mixture used as reactant in reactor 1 usually comprises several chemical compounds, often very many different chemical compounds. In many cases, the aqueous multicomponent mixture comprises a mixture of solid and liquid substances. Mixtures comprising organic compounds and inorganic components are preferably used as aqueous multicomponent mixture. In many cases, the exact composition of the aqueous multicomponent mixture is not known and/or varies from batch to batch. The aqueous multicomponent mixture may contain inorganic constituents such as metals and heavy metals or metal ions, metal salts, metal oxides, heavy metal ions, heavy metal salts, heavy metal oxides, phosphorus, phosphorus oxide, phosphate, nitrogen, nitrogen oxides, and ammonium. In many cases, inorganics and solids total less than 10 to 5% by volume, usually about 2% by volume of the aqueous multicomponent mixture.

Aqueous multicomponent mixtures that can be used as reactants in reactor 1 are, for example, organic multicomponent mixtures such as sludge, sewage sludge, biowaste, waste from biogas plants, aqueous organic waste, industrial waste, municipal waste, animal waste, agricultural waste, garden waste, animal meal, vegetable waste, pomace, fly ash, sewage sludge fly ash, food industry waste, drilling muds, digestate, manure, wastewater such as industrial wastewater, plastics, paper and cardboard. The aqueous multicomponent mixture that is used as reactant in the reactor 1 according to the invention must be pumpable. Solids or aqueous multicomponent mixtures with an excessively high solids content are pretreated accordingly, preferably comminuted and diluted.

The gasification product of supercritical hydrothermal gasification comprises synthesis gas dissolved in supercritical water. Preferably, the gasification product consists essentially of supercritical water in which synthesis gas is dissolved. The syngas comprises essentially hydrogen, methane, and carbon dioxide. The composition of the synthesis gas may vary depending on the reactant used, the embodiment of the reactor 1 according to the invention and the exact reaction conditions.

Applications of the reactor 1 according to the invention and the plants according to the invention are also subject of the invention. For example, application of the reactor 1 according to the invention and plants according to the invention for the production of synthesis gas, hydrogen, methane from aqueous multicomponent mixture. For example, application of the reactor 1 according to the invention and plants according to the invention for the separation of phosphate and ammonium from aqueous multicomponent mixtures. For example, application of the reactor 1 according to the invention and plants according to the invention for the production of fertilizer from aqueous multicomponent mixtures. For example, application of the reactor 1 according to the invention and the plants according to the invention for separating metal salts from aqueous multicomponent mixtures. For example, application of the reactor 1 according to the invention and plants according to the invention for separating solids from aqueous multicomponent mixtures. For example, application of the reactor 1 according to the invention and plants according to the invention of sand from aqueous multicomponent mixtures. For example, application of the reactor 1 according to the invention and plants according to the invention for separating metals from the aqueous multicomponent mixtures. For example, application of the reactor 1 according to the invention and plants according to the invention for the disposal of aqueous multicomponent mixtures. For example, application of the reactor 1 according to the invention and plants according to the invention for treatment or purification of water comprises. For example, application of the reactor 1 according to the invention and the plants according to the invention for energy supply. For example, application of the reactor 1 according to the invention and plants according to the invention for energy storage. For example, application of the reactor 1 according to the invention and plants according to the invention in waste disposal, water treatment and energy supply installations.

| | Reference sign |
|---|---|
| Reactor | 1 |
| Inner shell | 2 |
| Separation area | 3 |
| Heating area | 4 |
| Dwell area | 5 |
| Outer shell | 6 |
| Base plate | 7 |
| Steel scaffolding | 8 |
| Heat exchanger WT1 | 9 |
| Heat exchanger WT4 | 10 |
| Synthesis gas line | 11 |
| Heat exchanger WT2 | 12 |
| Heat exchanger WT3 | 13 |
| Line(s) | 14 |
| First pressure space | 15 |
| Second pressure space | 16 |
| Third pressure space | 17 |
| Funnel-shaped transition from the heating area to the dwell area | 18 |
| Flange connection | 19 |

FIG. 1 shows a reactor 1 according to the invention in longitudinal section with inner shell 2, separation area 3, heating area 4 and dwell area 5, wherein separation area 3, heating area 4 and dwell area 5 are arranged as an upright column.

Figure 2:
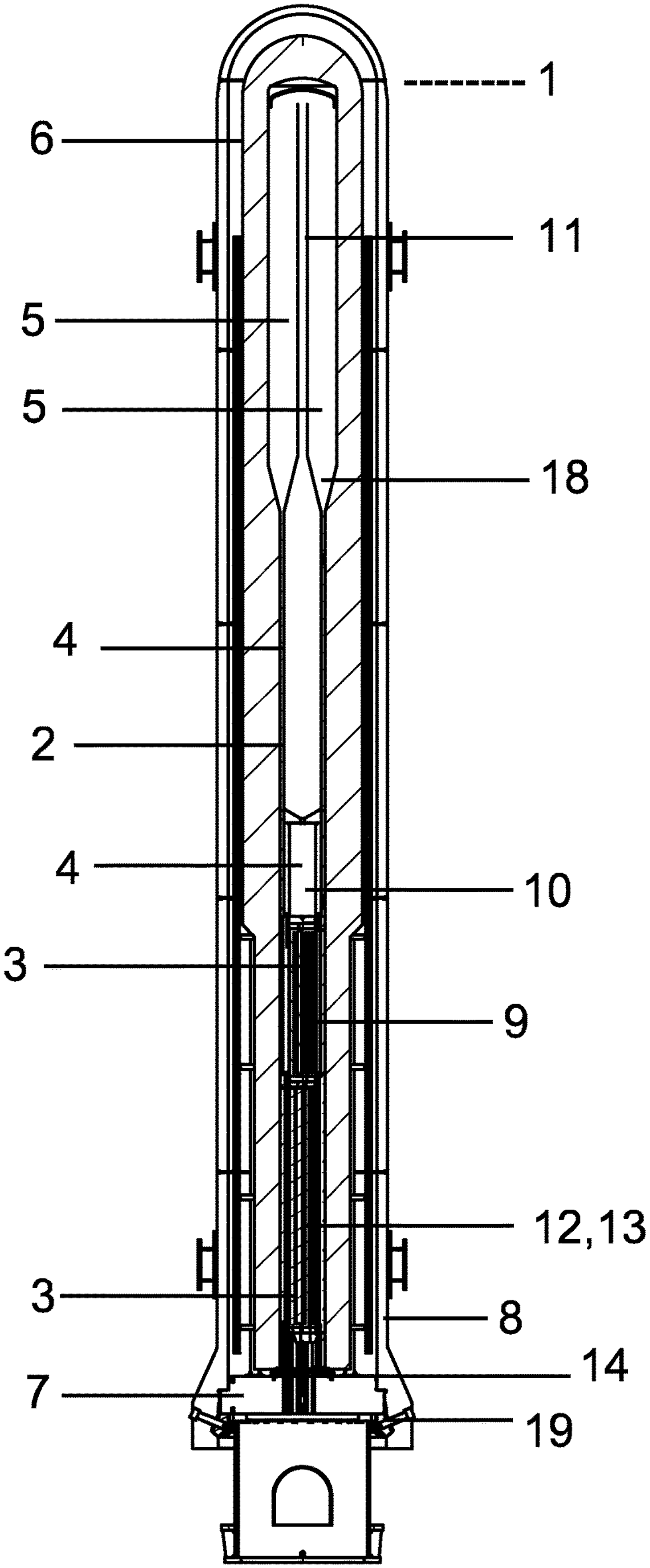

FIG. 2 shows a reactor 1 according to the invention in longitudinal section with inner shell 2, separation area 3, heating area 4 and dwell area 5, where separation area 3, heating area 4 and dwell area 5 are arranged as an upright column, outer shell 6, base plate 7, steel scaffold 8, heat exchanger WT1 9, heat exchanger WT4 10, heat exchangers WT2 and WT3 12, 13, lines 14, funnel-shaped transition from the annular gap in the heating area 4 to the annular gap in the dwell area 5 18, flange connection 19.

Figure 3:
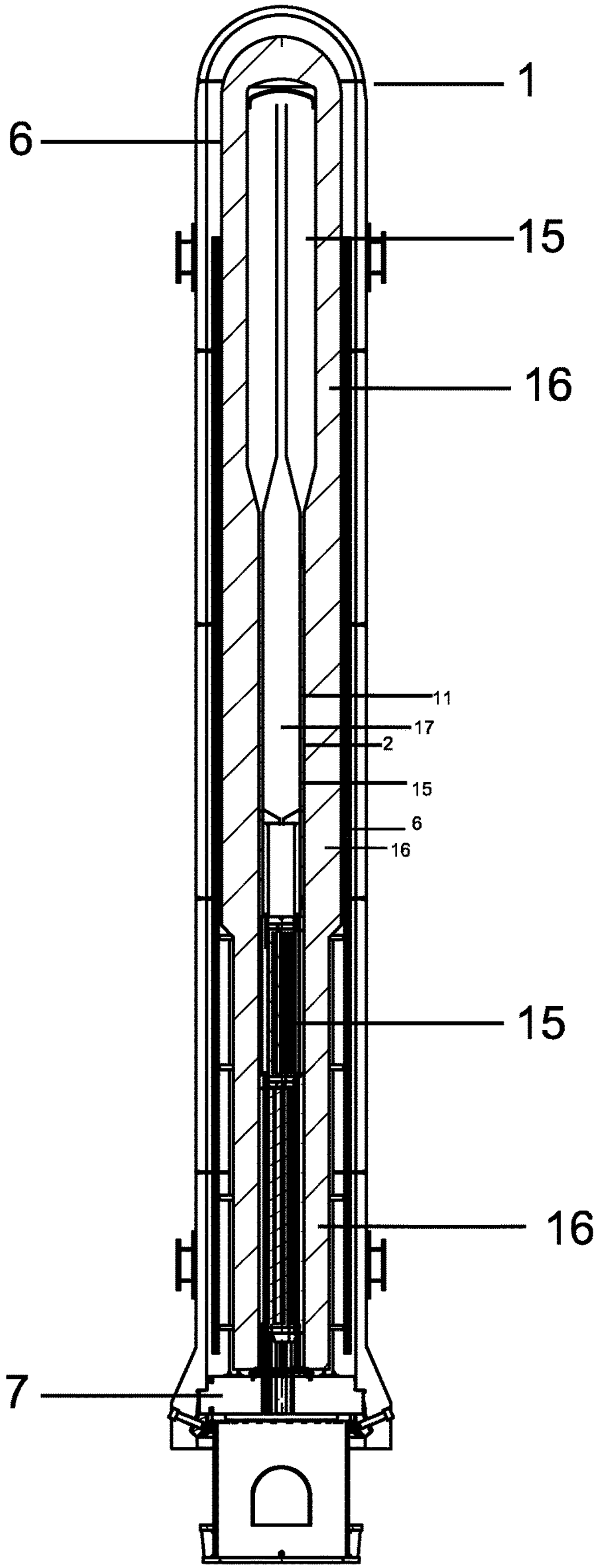

FIG. 3 shows a reactor 1 according to the invention in longitudinal section with inner shell 2, outer shell 6, base plate 7, synthesis gas line 11, first pressure space 15, second pressure space 16, third pressure space 17.

Figure 4:
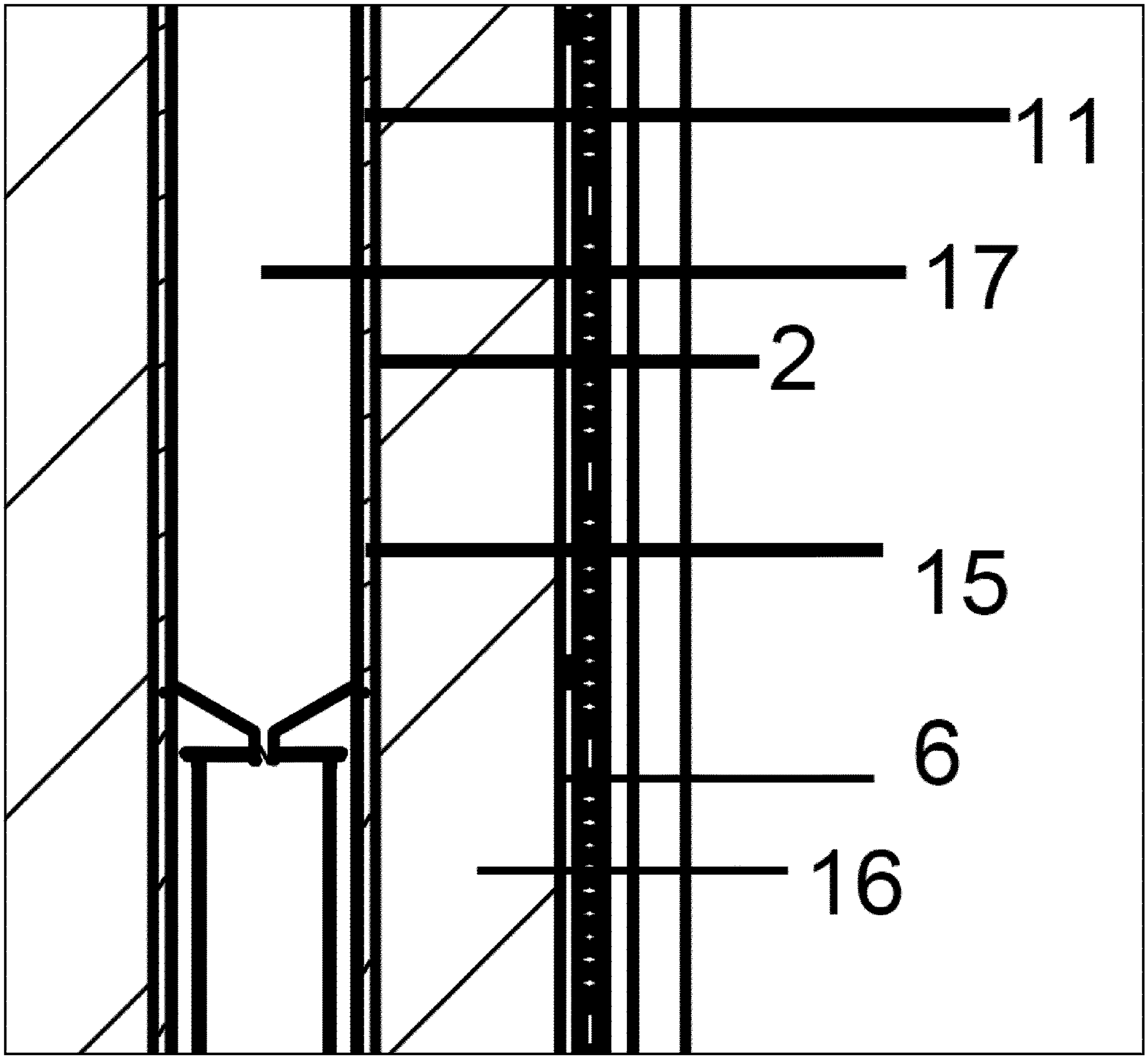

FIG. 4 shows an enlarged area of the reactor 1 of FIG. 3 according to the invention with inner shell 2, outer shell 6, synthesis gas line 11, first pressure space 15, second pressure space 16, third pressure space 17.

The invention claimed is:

1. A reactor for the supercritical hydrothermal gasification of aqueous multicomponent mixture compressed to 25 to 35 MPa in the absence of oxygen, comprising an inner shell which can be sealed in a pressure-tight manner and surrounds a first pressure space and an outer shell sealed in a pressure-tight manner surrounding the inner shell and between the inner shell and the outer shell a second pressure space, wherein the inner shell comprises a separating area comprising a heat exchanger WT3 for heating compressed aqueous multicomponent mixture to 200 to 300 degrees Celsius and a separator A3 for separating a valuable material fraction WF3 wherein solids are enriched, a heat exchanger WT2 for heating compressed aqueous multicomponent mixture to 300 to 400 degrees Celsius and the separator A2 for separating a valuable material fraction WF2 wherein metal salts are enriched, and a heat exchanger WT1 for heating compressed aqueous multi-component mixture to up to 550 degrees Celsius and a separator A1 for separating a valuable material fraction WF1 wherein phosphate and ammonium are enriched from the compressed aqueous multi-component mixture, a heating area for heating the compressed aqueous multicomponent mixture after separation of valuable material fractions WF3, WF2, WF1 to 600 to 700 degrees Celsius comprising a heat exchanger WT4 and a synthesis gas line, a dwell area for supercritical hydrothermal gasification of the compressed aqueous multicomponent mixture after heating to 600 to 700 degrees Celsius comprising the synthesis gas line, wherein the separation area, the heating area and the dwell area are arranged as an upright column, wherein the synthesis gas line forms an annular gap with the inner shell in part of the heating area or in the entire heating area, and wherein one or more heating elements are arranged in the second pressure space in the area surrounding the annular gap in the heating area for heating the compressed aqueous multicomponent mixture in the heating area to 600 to 700 degrees Celsius, wherein the synthesis gas line has one or more openings at the upper end and is thereby connected to the dwell area, and wherein the synthesis gas line conducts the supercritical water in which synthesis gas is dissolved into the heat exchanger WT4 for countercurrent heating compressed aqueous multicomponent mixture with the supercritical water in which synthesis gas is dissolved without the phases mixing, wherein the second pressure space comprises an inert gas or a mixture of inert gases or a liquid, that is compressible to the pressure of 25 to 35 MPa prevailing in the first pressure space, and wherein the second pressure space comprises at least one layer of thermally isolating material.

2. The reactor according to claim 1, further comprising a base plate wherein the inner shell comprises an opening for the base plate and wherein the base plate is pressure-tightly connected to the pressure-tightly sealable inner shell and wherein the inner shell and the outer shell comprises an opening for the base plate and the base plate is pressure-tightly connected to the pressure-tightly sealable outer shell, wherein the separation area is arranged above the base plate, the dwell area is arranged in the uppermost part of the inner shell and the heating area in the middle between the separation area and the dwell area, wherein the separation area being adjacent to the heating area and the heating area being adjacent to the dwell area.

3. The reactor according to claim 2, wherein the base plate is connected to the pressure-tight lockable inner shell via flange connections.

4. The reactor according to claim 2, wherein the base plate is connected to the pressure-tight lockable outer shell via flange connections.

5. The reactor according to claim 2, wherein the base plate is made of steel.

6. The reactor according to claim 1, further comprising a bypass, which bypasses heat exchanger WT4 and wherein heat exchanger WT4 comprising a bypass valve for regulating the amount of supercritical water in which synthesis gas is dissolved that flows through the heat exchanger WT4 or that flows past the heat exchanger WT4 directly into heat exchanger WT1 and thereby regulating the temperature for heating compressed aqueous multicomponent mixture in heat exchanger WT1.

7. The reactor according to claim 6, wherein the synthesis gas line is connected to the bypass and the heat exchanger WT4, the bypass and the heat exchanger WT4 are connected to the heat exchanger WT1, the heat exchanger WT1 is connected to the heat exchanger WT2, the heat exchanger WT2 is connected to the heat exchanger WT3 for heating compressed aqueous multicomponent mixture in countercurrent with supercritical water in which synthesis gas is dissolved, wherein heat exchanger WT1, heat exchanger WT2, heat exchanger WT3 and heat exchanger WT4 are pillow-plate heat exchangers for uniform and rapid heating of the compressed aqueous multicomponent mixture in the separation area.

8. The reactor according to claim 1, wherein the second pressure space comprises a compressible inert gas comprising ≤5 vol % hydrogen and at least 50 vol % nitrogen for preventing scaling.

9. The reactor according to claim 8, wherein the outer shell is made of steel.

10. The reactor according to claim 1, wherein the heat exchangers WT1, WT2, WT3 and WT4 are pillow plate heat exchangers for creating turbulence even at low velocities of the compressed aqueous multicomponent mixture and heating the compressed aqueous multicomponent mixture evenly and quickly when flowing through the heat exchangers and for compact arrangement of the heat exchangers in the reactor.

11. The reactor according to claim 1, wherein the inner shell at the end of the dwell area has the sharp of a bobbin bow for diverting supercritical water in which synthesis gas is dissolved into the synthesis gas line.

12. The reactor according to claim 1, wherein the synthesis gas line is located inside the dwell area and inside the heating area and wherein the diameter of the synthesis gas line increases as the synthesis gas line passes from the dwell area into the heating area.

13. The reactor according to claim 1, wherein the diameter available for the compressed aqueous multicomponent mixture to flow through widens at the transition from the heating area to the dwell area, for example the transition has the shape of a funnel, with the wide end of the funnel facing the dwell area.

14. The reactor according to claim 1, further comprising, in the heating area, a heat exchanger WT4, a bypass and a bypass valve, the heat exchanger WT4 and the bypass being arranged in the inner shell and being connected to the synthesis gas line and the heat exchanger WT1, the bypass bypassing the heat exchanger WT4 and, by means of the bypass valve, the proportion of supercritical water in which synthesis gas is dissolved, which flows from the synthesis gas line through the heat exchanger WT4 into the heat exchanger WT1 and the proportion of supercritical water in which synthesis gas is dissolved which flows from the synthesis gas line through the bypass into the heat exchanger WT1 can be adjusted to regulate the amount of heat which is transferred from the supercritical water in which synthesis gas is dissolved to the compressed aqueous multicomponent mixture in the separation area.

15. The reactor according to claim 1, wherein the inner shell, the heat exchanger WT1, the heat exchanger WT2, the heat exchanger WT3 the heat exchanger WT4, the separators A1, the separators A2 and separators A3 and the synthesis gas line have a wall thickness of 10 mm or less, preferably of 5 mm or less for very good heat transfer between compressed aqueous multicomponent mixture and supercritical water in which synthesis gas is dissolved.

16. A plant comprising a reactor according to claim 1, further comprising a product line and a reactant line connected to the first pressure space of the reactor, a high-pressure pump connected to the reactant line for compressing the aqueous multicomponent mixture to 25 to 35 MPa, a shredding device for comminution of multicomponent mixtures and a dilution plant connected to the reactant line, and a gas line connected to the second pressure space and to a gas storage.

17. A method for treatment, separation, purification, or production comprising a reacting material in the reactor according to claim 1:

a) to produce hydrogen and methane from aqueous multi-component mixtures and/or, b) to separate and optionally recover recyclable materials selected from phosphate, ammonium, metal salts, and solid substances from aqueous multi-component mixtures and/or, c) to produce fertilizer from aqueous multi-component mixtures and/or, d) to treat or purify water.

* * * * *